United States Patent [19]

Terashita et al.

[11] Patent Number: 4,942,424
[45] Date of Patent: Jul. 17, 1990

[54] METHOD OF AND APPARATUS FOR PRINTING COLOR PHOTOGRAPH AS WELL AS COLOR FILTER FOR USE IN THE SAME APPARATUS

[75] Inventors: Takaaki Terashita; Sethuo Okada, both of Kanagawa, Japan

[73] Assignee: Fuji Photo Film Co., Ltd., Kanagawa, Japan

[21] Appl. No.: 204,486

[22] Filed: Jun. 9, 1988

[30] Foreign Application Priority Data

| Jun. 12, 1987 | [JP] | Japan | 62-146542 |
| Jun. 12, 1987 | [JP] | Japan | 62-146543 |
| Jul. 30, 1987 | [JP] | Japan | 62-146544 |
| Aug. 11, 1987 | [JP] | Japan | 62-191187 |
| Aug. 11, 1987 | [JP] | Japan | 62-200508 |
| Aug. 11, 1987 | [JP] | Japan | 62-200509 |

[51] Int. Cl.$^5$ ............................................. G03B 27/80
[52] U.S. Cl. .................................... 355/38; 355/68; 355/77
[58] Field of Search .......................... 355/38, 68, 77; 356/404, 444; 358/75, 80; 350/317

[56] References Cited

U.S. PATENT DOCUMENTS

| 2,997,389 | 8/1961 | Boon | 350/316 |
| 4,050,807 | 9/1977 | Barbieri | 355/32 |
| 4,589,766 | 5/1986 | Fürsich et al. | 355/38 |
| 4,641,959 | 2/1987 | Terashita | 355/38 X |
| 4,657,378 | 4/1987 | Hope et al. | 355/38 |
| 4,702,548 | 10/1987 | Tanaka et al. | 350/316 X |

Primary Examiner—L. T. Hix
Assistant Examiner—D. Rutledge
Attorney, Agent, or Firm—Sughrue, Mion, Zinn, Macpeak & Seas

[57] ABSTRACT

A color photographic printing method of printing a film on the basis of the printing condition of a reference film type, comprises comparing the film characteristic of the reference film type with the film characteristic of the type of a film to be printed and correcting the printing condition of the reference film type on the basis of the result of this comparison. Accordingly, the proper printing condition of each type of film to be printed can be obtained from the printing condition of a single reference film type. A color photographic printing apparatus has a light source section for separating white light into red light, green light and blue light by a combination of a color glass and color separation filters of red, green and blue each provided with a dielectric multilayer film to project the light of each color onto a color film and a light measuring device for measuring red light, green light and blue light transmitted through the color film so that the amount of exposure is controlled on the basis of a predetermined reference printing condition and a measurement value provided by the light measuring device. The color separation filters are each constituted by the dielectric multilayer film and a filter member disposed in close contact with the coating of the dielectric multilayer film, it is possible to prevent variations in the spectral characteristic due to temperature changes.

16 Claims, 33 Drawing Sheets

FIG.11

|   |   |   |   |   |   | G'−B' |   |   |   |   |   |   |
|---|---|---|---|---|---|---|---|---|---|---|---|---|
| 4 | 4 | 4 | 4 | 4 | 4 | 4 | 4 | 4 | 4 | 4 | 2 | 2 |
| 4 | 4 | 4 | 4 | 4 | 4 | 4 | 4 | 4 | 3 | 3 | 2 | 2 |
| 4 | 4 | 4 | 4 | 4 | 1 | 1 | 1 | 3 | 3 | 3 | 3 | 2 |
| 4 | 4 | 4 | 4 | 1 | 1 | 1 | 1 | 3 | 3 | 3 | 3 | 2 |
| 5 | 4 | 4 | 1 | 1 | 1 | 1 | 1 | 3 | 3 | 3 | 3 | 2 |
| 5 | 5 | 4 | 1 | 1 | 1 | 0 | 0 | 1 | 3 | 3 | 2 | 2 |
| 5 | 5 | 5 | 1 | 1 | 0 | 0 | 0 | 0 | 1 | 1 | 2 | 2 |
| 5 | 5 | 5 | 1 | 1 | 0 | 0 | 0 | 0 | 1 | 1 | 2 | 2 |
| 5 | 5 | 5 | 1 | 1 | 1 | 0 | 0 | 1 | 1 | 7 | 7 | 7 |
| 5 | 5 | 5 | 5 | 1 | 1 | 1 | 1 | 1 | 1 | 7 | 7 | 7 |
| 5 | 5 | 5 | 6 | 6 | 1 | 1 | 1 | 1 | 1 | 7 | 7 | 7 |
| 5 | 5 | 6 | 6 | 6 | 6 | 6 | 6 | 6 | 7 | 7 | 7 | 7 |
| 5 | 6 | 6 | 6 | 6 | 6 | 6 | 6 | 6 | 6 | 7 | 7 | 7 |
| 6 | 6 | 6 | 6 | 6 | 6 | 6 | 6 | 6 | 6 | 6 | 7 | 7 |

— R'−G'

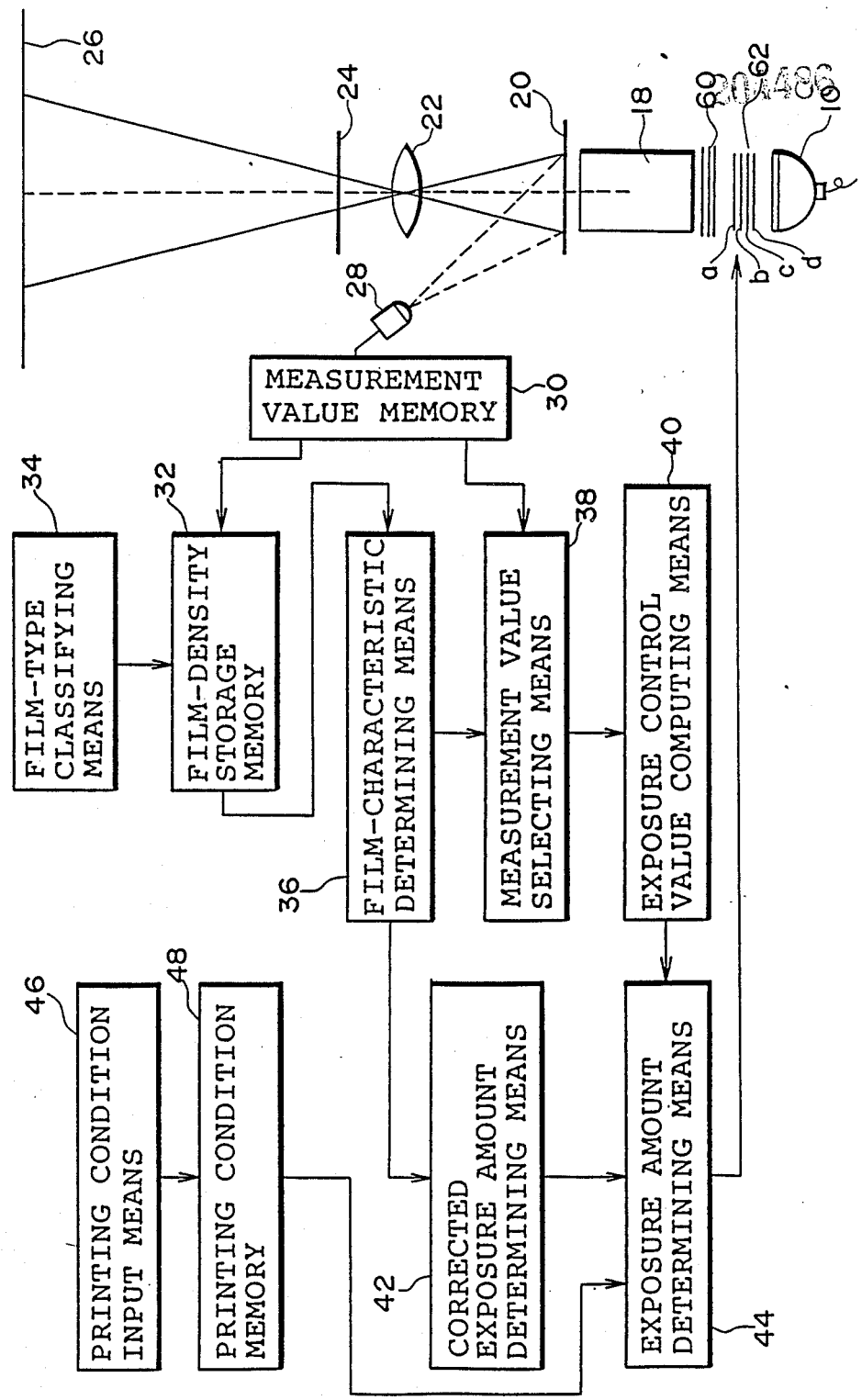

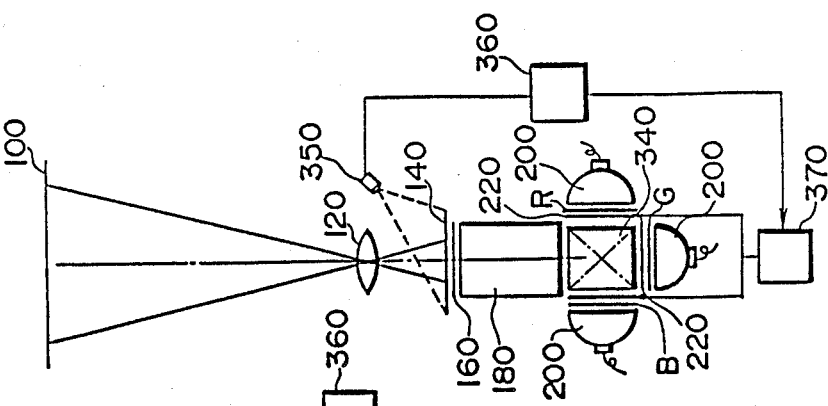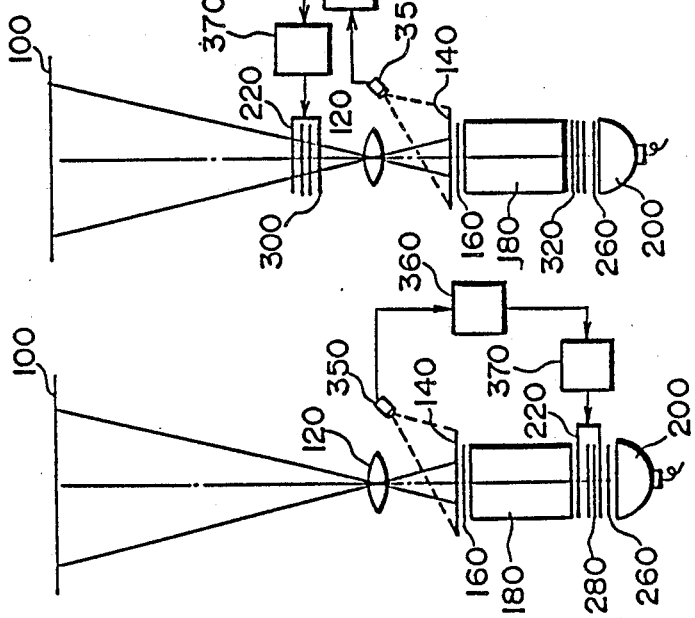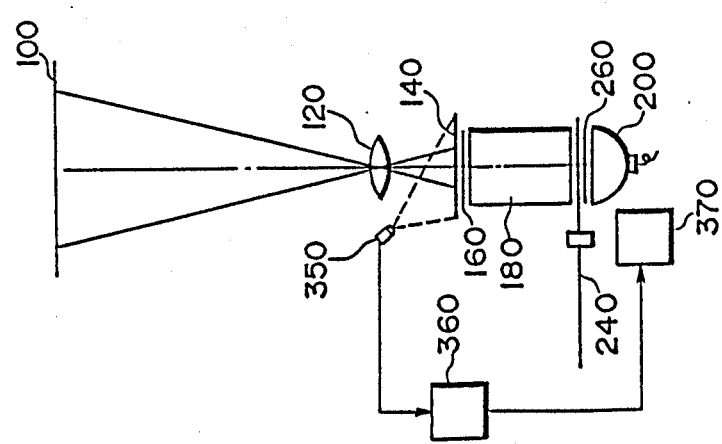
FIG.24A   FIG.24B   FIG.24C   FIG.24D

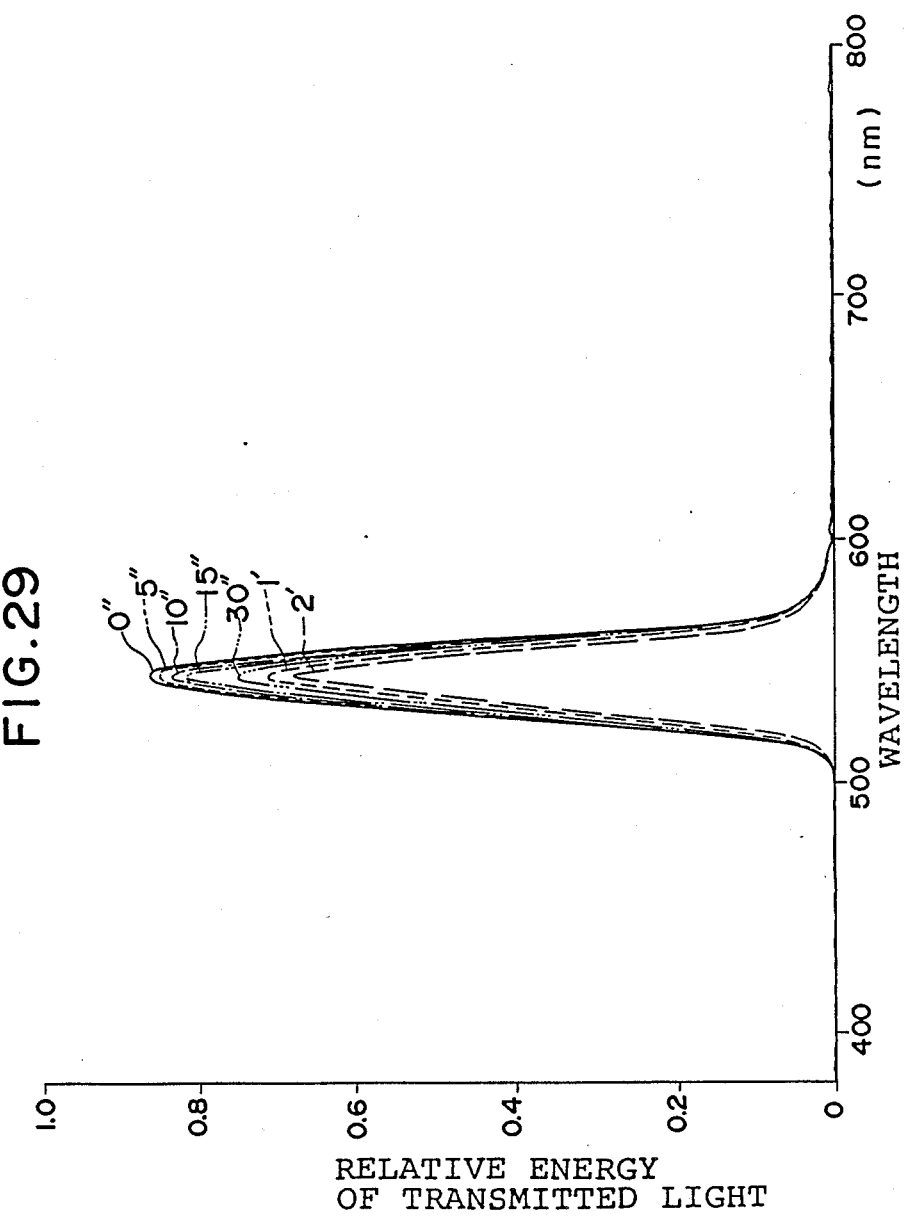

METHOD OF AND APPARATUS FOR PRINTING COLOR PHOTOGRAPH AS WELL AS COLOR FILTER FOR USE IN THE SAME APPARATUS

BACKGROUND OF THE INVENTION

1. Field of the Invention:

The present invention relates to a method of and an apparatus for printing color photographs as well as color filters for use in the apparatus. More specifically, the present invention pertains to a color photographic printing method capable of effecting printing by automatically determining, based on the printing condition of a reference film type, proper printing condition of each film type which differs in characteristic, and a color photographic printing apparatus employing such a method, as well as color filters for use in the same apparatus

2. Description of the Related Art:

Conventional types of automatic color photographic printing apparatus include a slope control function so that prints of fixed density may be produced from an overexposed or underexposed negative film The necessity of such a slope control function is derived from the reciprocity law failure of color paper, the noncoincidence of the spectral sensitivity distribution of the light measuring system of the automatic color photographic printing apparatus and that of each emulsion layer of the color paper, and the shape of the characteristic curve of each type of negative film.

The problem with the reciprocity law failure can be solved by preparing color paper with no or reduced reciprocity law failure. The problem with the spectral sensitivity distribution can be solved by making the spectral sensitivity distribution of the light measuring system to coincide with that of a corresponding exposure system. Japanese Patent Publication No. 4911/1970, Japanese Patent Laid-open No. 113627/1976, Japanese Patent Laid-open No. 64037/1978 and Japanese Patent Laid-open No. 220761/1984 disclose that the spectral sensitivity distribution of the light measuring system is made coincident with the exposure system by means of a filter or the like.

Films of some tens of types each having a different characteristic curve are presently manufactured. To cope with such various film characteristic curves, Japanese Patent Laid-open No. 29641/1974 proposes an electrical circuit for correcting the nonlinear portions of the upper and lower end portions of such a film characteristic curve to obtain an approximately linear form. This proposal, however, is not satisfactory in that no account is taken of the fact that an image is formed in the nonlinear portions. In addition, no account is taken of the way of detecting the non-linearity or the difference in the nonlinearity of each type of film.

In a case where, as described above, the spectral sensitivity distribution of the light measuring system coincides with that of the exposure system, each type of film can be properly printed based upon the printing condition of a particular film type only when the three film characteristic curves of R(red), G(green) and B(blue) are approximately parallel to the three R, G and B curves of the particular film type. In this case only, the relationship between the density of each image and a density value for exposure control which is determined from such an image density is constant irrespective of the type of film.

However, the aforesaid related art of maintaining the coincidence of the spectral sensitivity distributions involves the problem that, since the shape of each film characteristic curve is not taken into account, it is impossible to determine the optimum printing condition of a film of each type which differs in the shape of a characteristic curve.

SUMMARY OF THE INVENTION

It is therefore an object of the present invention to provide a color photographic printing method capable of automatically determining the proper printing condition of each film type which differs in characteristic by taking into account the film characteristic thereof, and a color photographic printing apparatus employing such a method as well as a color filter for use in the same apparatus.

To achieve the above and other objects, in accordance with a first aspect of the present invention, there is provided a color photographic printing method of printing a film on the basis of the printing condition of a reference film type, comprising the steps of calculating the film characteristic of the type of a film to be printed, comparing the film characteristic of the reference film type with the film characteristic of the type of the film to be printed, and correcting the printing condition of the reference film type on the basis of the result of the comparison to effect printing of the film.

In accordance with the first aspect of the present invention, the film characteristic of the type of the film to be printed is calculated, and the film characteristic of the reference film type is then compared with the film characteristic of the type of the film to be printed. Then, the printing condition of the reference film type is corrected on the basis of the result of the comparison, and prints are produced from the film to be printed. The film characteristic is selected from among the spectral characteristic of a coloring material of a film, a $\gamma$ value, a film base density and a density or value defining the shape of the characteristic curve of the film. In a case where the printing condition is corrected using the $\gamma$ value, the amount of exposure correction may be used which is obtained from the ratio of the $\gamma$ value of each film type to the $\gamma$ value of the reference film type, a slope control ratio calculated from the density ratio of these film types, the difference between the $\gamma$ value of the reference film type and the $\gamma$ value of each film type, or the difference in density between these film types.

As described above, the first aspect of the present invention provides the effects that, since the proper printing condition of each film type can be obtained from a single printing condition, high-quality prints can be produced from an overexposed or underexposed negative film, and that, since a single printing condition is used, it is possible to cope with characteristic variations.

In accordance with a second aspect of the present invention, there is provided a color photographic printing apparatus comprising a light source section for separating white light into red light, green light and blue light by means of corresponding color separation filters of red, green and blue to project light of the three colors onto a color film, the color separation filters being each provided with a dielectric multilayer film having a transmittance wavelength band contained in the photographic wavelength region of each of red-sensitive, green-sensitive and blue-sensitive layers of color paper and a color glass or light transmitting member which is disposed in close contact with the dielectric multilayer film; a light measuring device for measuring the three colors carried by the respective red, green and blue lights emitted from the light source section and transmitted through the color film; a light measuring device provided with a spectral sensitivity distribution approximately equal to or greater than the half-width of the spectral transmittance distribution of the color separation filters; and control means for controlling the amount of exposure on the basis of a predetermined printing condition of a reference film type and the measurement value provided by the light measuring device.

In the second aspect of the present invention, the light source section is comprised of a light source and color separation filters each provided with a color glass and a dielectric multilayer film, and the light transmitted through the respective color separation filters is separated into red light, green light and blue light which are effectively lowered in sensitivity at the short-wave and long-wave edges of the distributions of the respective red, blue and green spectral sensitivities of color paper. The filter constituted by the color glass has the characteristic that its spectral transmission characteristic shifts to a long-wave side due to temperature variations during measurement of or exposure to light. The filter coated with a dielectric multilayer film has the characteristic that its spectral transmission characteristic shifts to a short-wave side due to temperature variations similar to those described above. Accordingly, in an embodiment according to the second aspect of the present invention, since each of the color separation filters is provided with such color glass and dielectric multilayer film, the shifts of the spectral characteristic to the short-wave and long-wave sides are cancelled so that thermally stable spectral sensitivity distribution characteristics can be obtained and the color separation filters can be used in the vicinity of the light source. Accordingly, an additive color type of printing system employing such a filter and the light measuring device having a wide spectral sensitivity distribution can be used to make the spectral sensitivity characteristic of the light measuring system coincide with that of the exposure system at high precision that has never been achieved.

The light measuring device simultaneously or sequentially measures red light, green light and blue light emitted from the light source section and transmitted through a color film such as a negative film. Preferably, the measurement value provided by the light measuring device is a value from which the object dependency (such as a color failure) of the negative film is eliminated by a measurement value selecting means for effecting selection on the basis of a predetermined reference. The control means controls the amount of exposure on the basis of a predetermined reference printing condition and the measurement value provided by the light measuring device. The reference printing condition is determined with respect to a film type having a particular characteristic and, in one preferred exposure control system according to the second aspect of the present invention, the film characteristic of the reference film type is compared with the film characteristic of the film type which is determined from the measurement value provided by the light measuring device, to correct the reference printing condition for each film type, thereby controlling the amount of exposure.

The color separation filter described above may be constituted by a first member coated with a dielectric multilayer film which forms a transmission wavelength band and a second member which is intimately contacted with the coated surface of the first member, and thus the sensitivity of the color separation filter may be effectively lowered at the short-wave and long-wave sides of the spectral sensitivity distribution of color paper. Accordingly, if the second member is bonded by an adhesive or the like to the coated surface of the first member that is coated with the dielectric multilayer film, it is possible to achieve stable characteristics even if the dielectric multilayer film is disposed near the light source section.

The material of the first member may be selected between a color glass filter and a multi-coated filter in which a dielectric multilayer film which does not interfere its transmittance wavelength band is coated on a surface which is not bonded to the second member, that is, a surface which is not coated with the dielectric multilayer film which forms the transmittance wavelength band. The material of the second member may be selected between a color glass filter and a multi-coated filter coated with a dielectric multilayer film which does not interfere its transmittance wavelength band. The first member and the second member may be intimately bonded together by applying a heat-resistant adhesive to the overall surfaces thereof or to the peripheries thereof, or may be sealed by a resin or heat-resistant rubber.

Also, the filter having the above-described construction may be coated with a reflection film to form a filter, such as a dichroic mirror, employing reflected light. Although the following description refers to several filter arrangements by way of example, the present invention is not limited to such arrangements and encompasses corresponding mirror arrangements.

The first member or the second member is constituted by a long-wave transmitting color glass filter having an absorption band on a wavelength side which is shorter in wavelength than the short-wave edge of the transmission wavelength band which is formed by the dielectric multilayer film. In this manner, the transmission wavelength edge of the color glass filter is provided on a wavelength side which is shorter (for example, by about 8 nm or greater) in wavelength than the wavelength edge of the transmission wavelength band formed by the dielectric multilayer film so that the color glass filter may not interfere the transmission wavelength band even when the characteristics of the filter vary by heat during use. The color glass filter has an extremely high absorption characteristic, and can be combined with a multi-coated filter having a sharp spectral characteristic and allowing selection of an arbitrary wavelength to make narrow the wavelength band which is to be absorbed by the multi-coated filter. Accordingly, it is possible to facilitate the production of filters and to produce low-cost filters of high reliability.

As described above, in accordance with the second aspect of the present invention, the color separation filters each constituted by the color glass and the dielectric multilayer film are employed so that the the manner of variations in the spectral characteristic may stabilize with respect to temperature rises, and an additive color type light source having a sharp color separation characteristic and a light measuring device having a broad spectral sensitivity distribution are used, whereby it is possible to easily achieve the coincidence of the spectral sensitivity distributions of the light measuring system and the exposure system at high precision that has never been realized. In addition, use of such exposure and light measuring systems enables production of low-cost small color photographic printing apparatus of various types which differ in throughput.

In accordance with a third aspect of the present invention, there is provided a color photographic printing apparatus in which red light, green light and blue light of light transmitted through a color film are measured by a light measuring device and color filters of yellow, magenta and cyan are inserted into an optical path in accordance with the measurement value provided by the light measuring device so that the amount of exposure of each of red-sensitive, green-sensitive and blue-sensitive layers of color paper is controlled to produce a print from the color film. The apparatus comprises a first limiting filter capable of limiting the long wave of blue light and the short wave of green light; a second limiting filter capable of limiting the long wave of green light and the short wave of red light; an ultraviolet cutoff filter; and an infrared cutoff filter, with these filters disposed between the color film and the light source so that the ultraviolet cutoff filter and the first limiting filter cooperate with each other to form blue light for exposure, the first limiting filter and the second limiting filter cooperating with each other to form green light for exposure, and the infrared cutoff filter and the second limiting filter cooperating with each other to form red light for exposure. The light measuring device comprises a color separation filter device including a blue filter having a transmittance long-wave edge contained in one of the wavelength region between the short-wave edge of the absorption band of the first limiting filter and a predetermined wavelength shorter than the short-wave edge and the absorption band of the first limiting filter; a green filter having a transmittance short-wave edge contained in one of the wavelength region between the long-wave edge of the absorption band of the first limiting filter and a predetermined wavelength longer than the long-wave edge and the absorption band of the first limiting filter and a transmittance long-wave edge contained in one of the wavelength region between the short-wave edge of the absorption band of the second limiting filter and a predetermined wavelength shorter than the short-wave edge and the absorption band of the second limiting filter; and a red filter having a transmittance short-wave edge contained in one of the wavelength region between the long-wave edge of the absorption band of the second limiting filter and a predetermined wavelength longer than the long-wave edge and the absorption band of the second limiting filter.

The color photographic printing apparatus according to the third aspect of the present invention is a subtractive color type of color photographic printing apparatus in which the red (R) light, green (G) light and blue (B) light of the light transmitted through a color film are measured by the light measuring device and the color filters of yellow (Y), magenta (M) and cyan (C) are inserted into the optical path in accordance with the measurement value provided by the light measuring device to produce a print from the color film. The apparatus comprises the first limiting filter, the second limiting filter, the ultraviolet cutoff filter and the infrared cutoff filter. As illustratively shown in FIG. 14(c), the first limiting filter is capable of limiting the long wave of blue light and the short wave of green light, that is, the first limiting filter has an absorption band between a peak of the blue light and a peak of the green light. As similarly shown in FIG. 14(c), the second limiting filter is capable of limiting the long wave of green light and the short wave of red light, that is, the second limiting filter has an absorption band between a peak of the green light and a peak of the red light. The ultraviolet cutoff filter can cut off ultraviolet rays to limit the short wave of blue light. The infrared cutoff filter can cut off infrared light to limit the long wave of blue light. Therefore, blue light for exposure can be formed by a combination of the ultraviolet cutoff filter and the first limiting filter, green light for exposure can be formed by a combination of the first limiting filter and the second limiting filter, and red light for exposure can be formed by a combination of the infrared cutoff filter and the second limiting filter.

The light measuring device comprises a color separation filter device including a blue filter having a transmittance long-wave edge contained in one of the wavelength region between the short-wave edge of the absorption band of the first limiting filter and a predetermined wavelength shorter than the short-wave edge and the absorption band of the first limiting filter; a green filter having a transmittance short-wave edge contained in one of the wavelength region between the long-wave edge of the absorption band of the first limiting filter and a predetermined wavelength longer than the long-wave edge and the absorption band of the first limiting filter and a transmittance short-wave edge contained in one of the wavelength region between the short-wave edge of the absorption band of the second limiting filter and a predetermined wavelength shorter than the short-wave edge and the absorption band of the second limiting filter; and a red filter having a transmittance short-wave edge contained in one of the wavelength region between the long-wave edge of the absorption band of the second limiting filter and a predetermined wavelength longer than the long-wave edge and the absorption band of the second limiting filter. Accordingly, if the previously-described four filters are combined with the color separation filter device, it is possible to provide the transmittance distribution shown by broken lines in FIG. 14(B) or a combination of broken and solid lines in FIG. 17. Therefore, the coincidence of the spectral sensitivity distributions of the light measuring system and the exposure system can be easily realized.

As described above, in accordance with the third aspect of the present invention, there is provided a color photographic printing apparatus of a subtractive color type in which a decrease in the quantity of light emitted from the light source is made small and in which a single light source can be used to produce R, G and B light devoid of mixture which is compared to the color light produced by an additive color type of color photographic printing apparatus. Accordingly, the coincidence of the spectral sensitivity distributions of color paper and the light measuring system can be achieved easily and at high precision, and it is possible to reduce the influences of the nonuniformity of characteristics which may be caused during manufacture and the difference in spectral sensitivity distribution between each sheet of color paper. Therefore, films of various types each having a different characteristic can be printed on the basis of a single printing condition, irrespective of the difference between the optical systems (the light measuring system and the exposure system). In addition, it is possible to prevent the occurrence of color failure by using the measurement value provided by the light measuring device having a plurality of light receiving elements.

BRIEF DESCRIPTION OF THE DRAWINGS

A better understanding of the present invention may be gained from the following detailed description, when read in connection with the accompanying drawings, in which:

FIG. 11 is a diagrammatic illustration of color regions;

FIG. 13 is a schematic diagram showing a second embodiment of the present invention which is applied to a white-light subtractive-color type of automatic color photographic printing apparatus;

FIG. 29 is a chart showing variations in the relative energy distribution of transmitted light with respect to variations in the temperature of the filter shown in FIG. 28;

Description of the Preferred Embodiments

Preferred embodiment of the present invention will be described below with reference to the accompanying drawings.

An additive color type of automatic color photographic printing apparatus to which the present invention is applicable will be described below with reference to the accompanying drawings.

Figure 1:
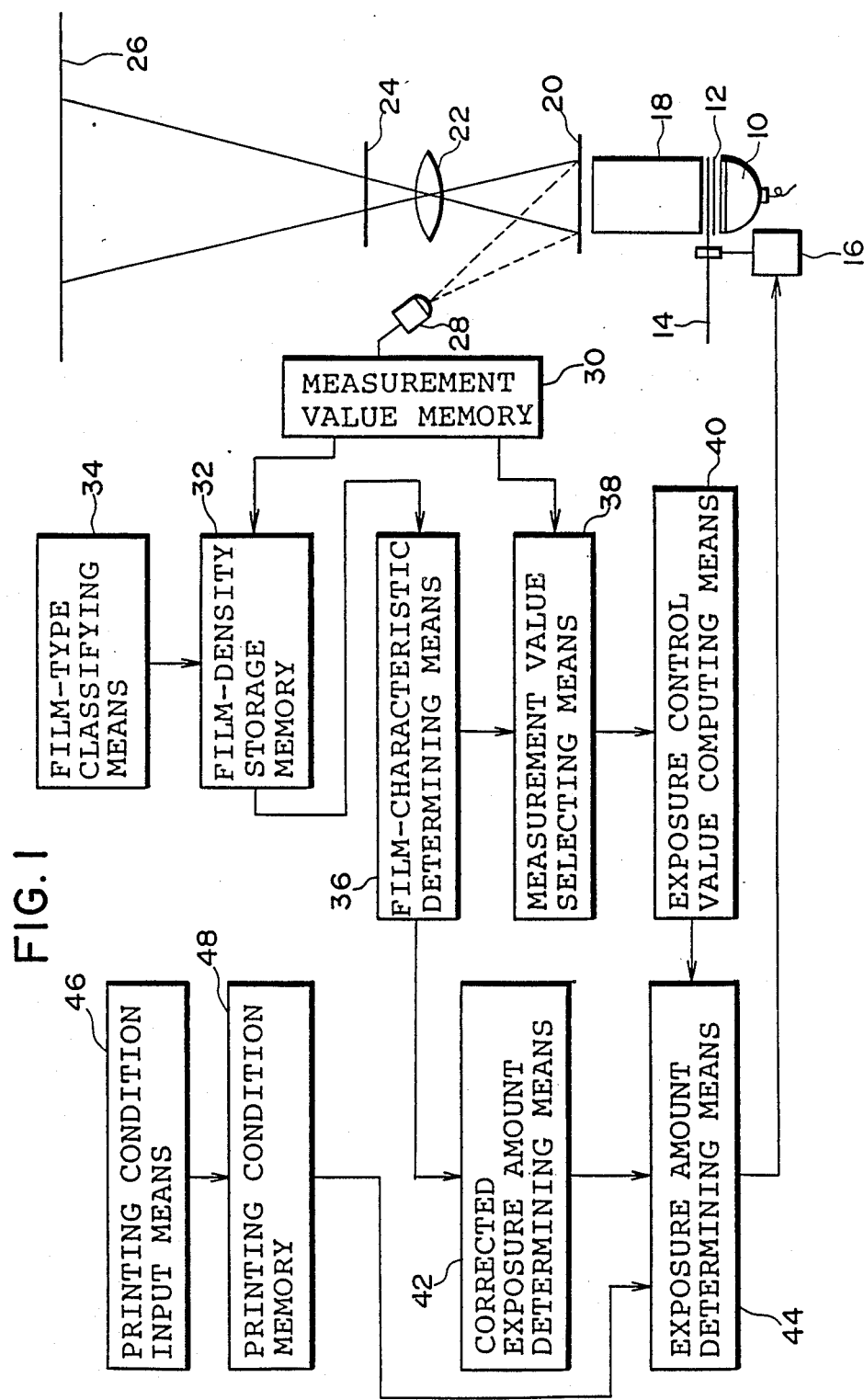
FIG. 1 is a schematic diagram showing a first embodiment of the present invention which is applied to an additive color type of automatic color photographic printing apparatus.

As shown in FIG. 1, a mirror box 18 and a lamp house 10 provided with a halogen lamp are arranged in this order at a location below a negative film 20 carried by a negative carrier and placed in a printing section. A rotating disk 14 rotated by a motor 16 as well as an infrared cutoff filter 12 are inserted between the mirror box 18 and the lamp 10.

Figure 2:
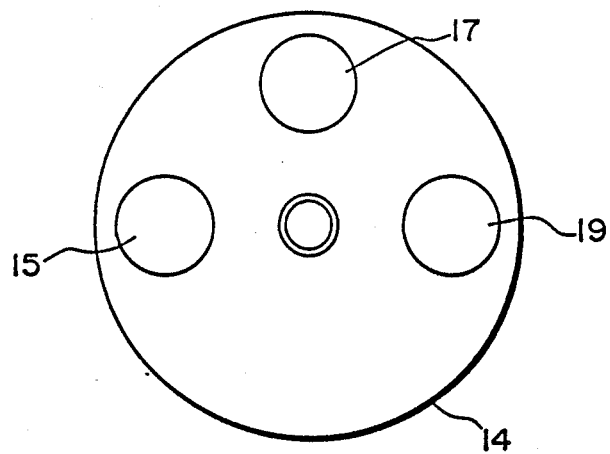
FIG. 2 is a top plan view of the rotating disk shown in FIG. 1.
Figure 3A:
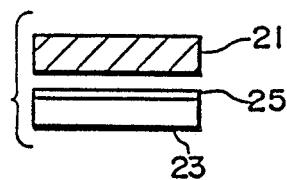
FIGS. 3(A) and (B) are a schematic cross sectional view of examples of the filter shown in FIG. 2.

As shown in FIG. 2, the rotating disk 14 is provided with a color separation filter device constituted by a G (green) filter 15, a B (blue) filter 17 and an R (red) filter 19 which are disposed around the circumference of the rotating disk 14. Each of the G filter 15, the B filter 17 and the B filter 19 is, as shown in FIG. 3(A), constituted by a white glass 23 coated with a dielectric multilayer film 25 and a color glass 21 of R, G and B, respectively, with the white glass 23 being parallel to the white glass 23. Since the infrared cutoff filter 12 is normally located on the side of the lamp 10, the filter 12 is thermally stable except for immediately after the lamp house 10 has been turned on. However, since the G filter 15, the B filter 17 and the R filter 19 are sequentially located above the lamp house 10 by the rotation of the rotating disk 14, there is a risk that each of these filters may be thermally unstable when inserted between the mirror box 18 and the lamp house 10.

Figure 4A:
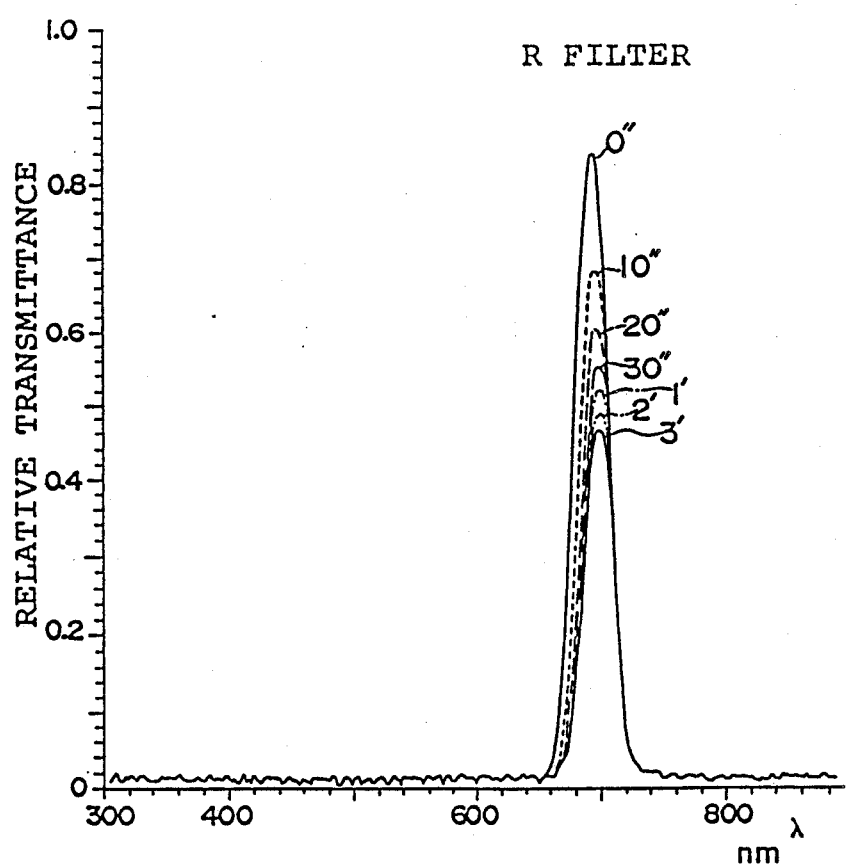
FIGS. 4(A), 4(B), and 4(C) are charts respectively showing the characteristics of R filters.
Figure 4B:
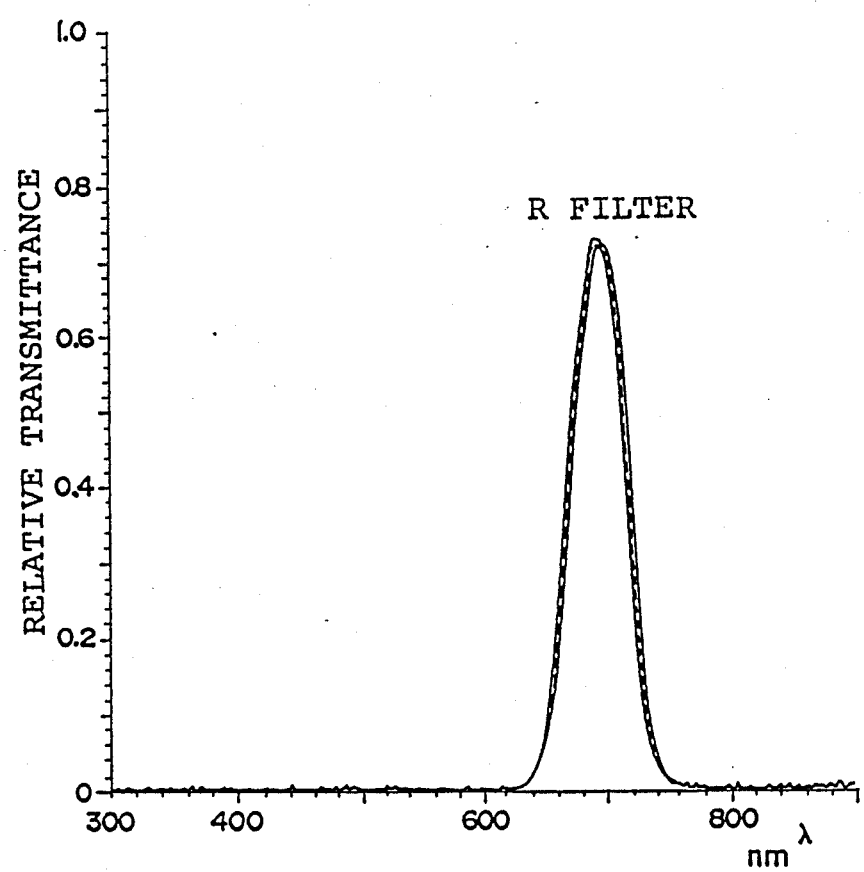
Figure 4C:
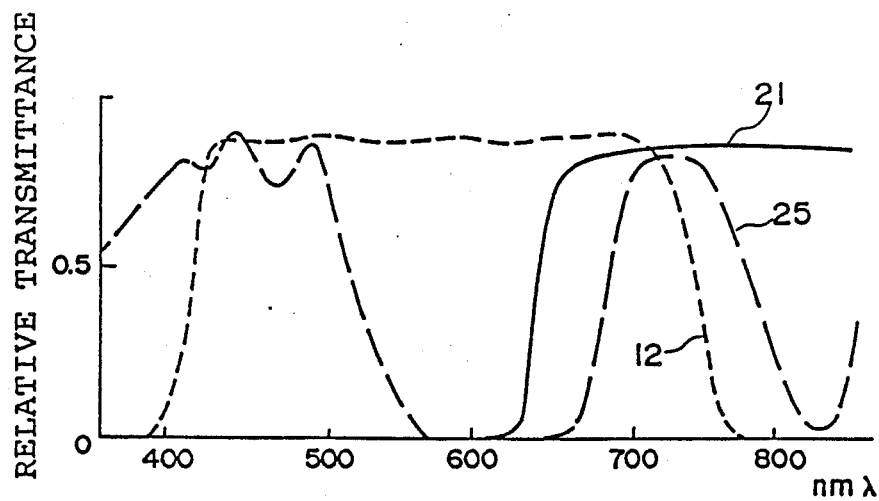

FIG. 4(A) shows the characteristics obtained when the rotating disk 14 having an R filter constituted by a color glass only is rotated in the vicinity of a light source as shown in FIG. 1. As illustrated, as the rotating disk 14 rotates, the temperature in the plane of the color separation filter reaches about 150° C. within several seconds, and thus its relative transmittance varies. It is generally known that the color glass filters of R, G and B exhibit wavelength shifts of 0.15 nm/° C., 0.10 nm/° C., and 0.08 nm/° C., respectively, and therefore it is not suitable to use the color glass filters while rotating them in such a high-temperature area. In addition, it is known that the spectral curve of the dielectric multilayer film shifts to a long-wavelength side in a raised-temperature condition, while the spectral curve shifts to a short-wavelength side in a vacuum. Accordingly, at high temperatures such as those in the present embodiment, it is possible to use a filter consisting of a color glass alone or a filter consisting of a dielectric multilayer film alone. However, in the present embodiment, a color glass filter which shifts to a long-wavelength side due to temperature variations and a filter coated with a dielectric multilayer film which shifts to a short-wavelength side due to temperature variations are constituted as shown in FIG. 4(C), whereby variations due to heat can be prevented as shown in FIG. 4(B). FIG. 4(C) shows the manner in which the color glass filter (R-64 filter made by HOYA GLASS Co., Ltd.) 21 and the dielectric multilayer film 25 are combined to form the short wavelengths of R, with the thermally stable infrared cutoff filter 12 forming the long wavelengths of R.

Figure 3B:

As shown in FIG. 3(B) each of the G filter 15, the B filter 17 and the R filter 19 may be constituted by the color glass 21 having a surface coated with the dielectric multilayer film 25.

Referring back to FIG. 1, a lens 22, a black shutter 24 and a sheet of color paper 26 are arranged in this order above the negative film 20. The light rays emitted by the lamp house 10 are transmitted through the infrared cutoff filter 12, the filters of the rotating disk 14, the mirror box 18 and the negative film 20, and are focused on the color paper 26 by the lens 22.

A two-dimensional image sensor 28 as a light measuring device is disposed on an axis parallel to the direction inclined with respect to the optical axis of the aforesaid focusing optical system and at a location which allows measurement of the density of an image in the negative film 20. The two-dimensional image sensor 28 is provided with a storage type photoelectric conversion device such as a CCD or a MOS, an optical system for focusing an image in the negative film 20 on the photoelectric conversion device, and a signal processing circuit for processing the output of the photoelectric conversion device and outputting the processed signals as image information. The signal processing circuit converts the output of the photoelectric conversion device into a digital signal, then effects logarithmic conversion of the reciprocal of the digital signal, and then outputs the thus-obtained signal as a density signal.

Figure 5A:
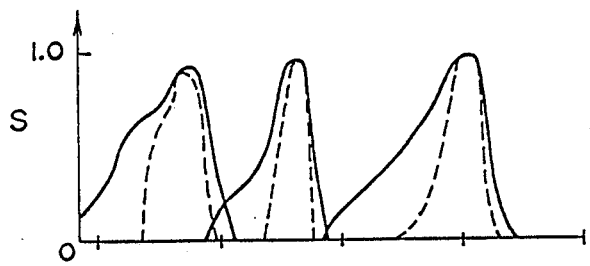
FIGS. 5(A), 5(B) and 5(C) are charts respectively showning the characteristics or the like of color paper and the distribution of the spectral sensitivity of a two-dimensional image sensor in an additive color process.
Figure 5B:
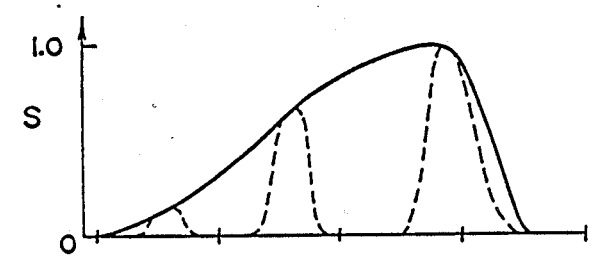
Figure 5C:
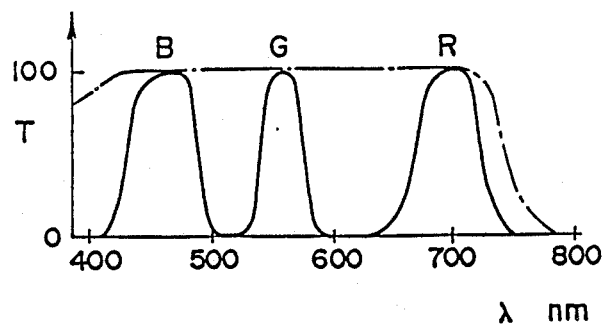

The characteristic of the infrared cutoff filter 12 is as shown by a one-dot chain line in FIG. 5(C), and the relative spectral transmittance of the three-color separation filter for the rotating disk is as shown by a solid line in FIG. 5(C). The relative sensitivity distribution of the two-dimensional image sensor 28 is as shown by a solid line in FIG. 5(B), and the spectral sensitivity distribution of the two-dimensional image sensor 20 in an additive color process is as shown by a broken line in FIG. 5(B). The relative spectral sensitivity distribution of the color paper is as shown by a solid line in FIG. 5(A), and the spectral sensitivity distribution of the color paper in the additive color process is as shown by a broken line in FIG. 5(A).

Referring back to FIG. 1, the above-described two-dimensional image sensor 28 is connected to a measurement value memory 30 for storing density signals output from the two-dimensional image sensor 28. The measurement value memory 30 is connected to a film-density storage memory 32 for storing the density of each film type and a measurement value selecting means 38. A film-type classifying means 34 is connected to the film-density storage memory 32, and the film-density storage memory 32 is connected through a film-characteristic determining means 36 to the measurement value selecting means 38 and a corrected exposure amount determining means 42. The measurement value selecting means 38 is connected to an exposure-value determining means 44 through an exposure control value computing means 40, and the film.-characteristic determining means 36 is connected to the exposure-value determining means 44 through the corrected exposure amount determining means 42. A printing-condition input means 46 is connected to the exposure-value determining means 44 through a printing-condition memory 48. The exposure-value determining means 44 controls the motor 16 to rotate the rotating disk 14, thereby controlling the amount of exposure.

The operation of the present embodiment will be described while referring to each of the above-mentioned blocks shown in FIG. 1.

The film-type classifying means 34 classifies negative films by types so that negative films which are common in terms of some of parameters such as a maker, a coloring material, a γ value, base density, sensitivity, and the shape of a characteristic curve may be classified as an identical type. The film-type classifying means 34 may be selected from among devices such as a DX code read-out device for reading out a DX code to which is exposed a side edge portion of each negative film and a device for reading out the characteristics of coloring materials used in a negative film by detecting a peak value of transmission density with respect to the wavelength characteristic of the negative film. The film-type classifying means 34 may be constituted by a keyboard, and, if desired, an operator may classify the type of film for himself and manually input the result.

The printing condition input means 46 is used to input a printing condition relative to R, G and B of a reference film type, for example, SUPER HR100 (the name of a product manufactured by Fuji Photo Film Co. Ltd.,), and the printing condition memory 48 stores the printing condition. The printing condition may be at least one selected from among the amount of exposure, exposure time, the amount of filtering, the luminance of a light source, the voltage of the light source, and the value of slope control.

The film-density storage memory 32 stores the outputs of the measurement value memory 30 in such a way that they are accumulated in accordance with the types of films classified by the film-type classifying means 34 and, for example, the art set forth in Japanese Patent Laid-open No. 237749/1986 may be utilized. More specifically, the densities of respective measurement points, those of respective portions of an image plane, or that of the entire image plane is totalized to provide an average value, and the thus-obtained average density of negative film is stored.

Figure 6A:
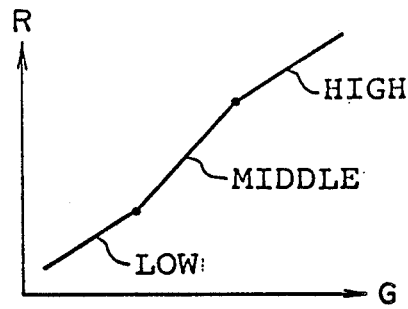
FIGS. 6(A) and 6(B) are charts respectively showing examples of the characteristic curves.
Figure 6B:
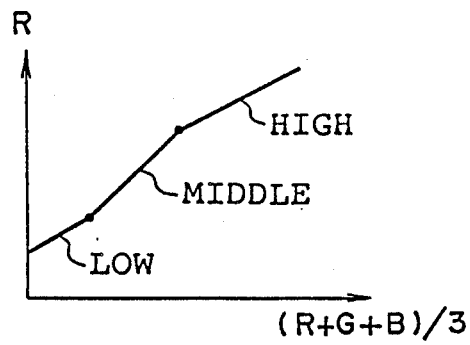

The film-characteristic determining means 36 determines the characteristics of a negative film in accordance with the densities of R, G and B which are obtained by the film-density storage memory 32. The following description refers to an example which employs the slope (Y value) of the characteristic curve of a film as the characteristic of the film. First, the characteristic curve of each of R, G and B of the film is obtained by calculating the ratio of each of the R, G and B densities provided by the film-density storage memory 32 to a reference value (for example, the G density or the average density of R, G and B (R +G +B)/3). FIG. 6(A) shows the characteristic curve of the R density with respect to the G density, with FIG. 6 showing the characteristic curve of the R density with respect to the density of (R +G +B)/3.

Figure 7A:
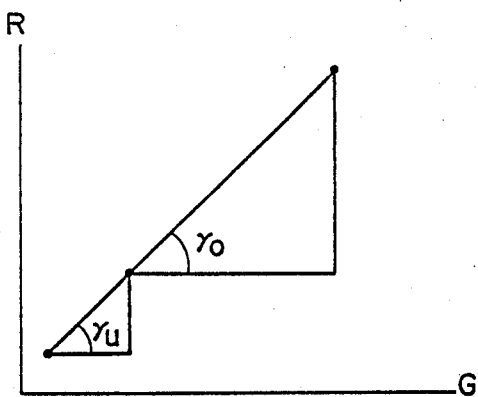
FIGS. 7(A), 7(B) and 7(C) are charts respectively showing examples, of the characteristic curves.
Figure 7B:
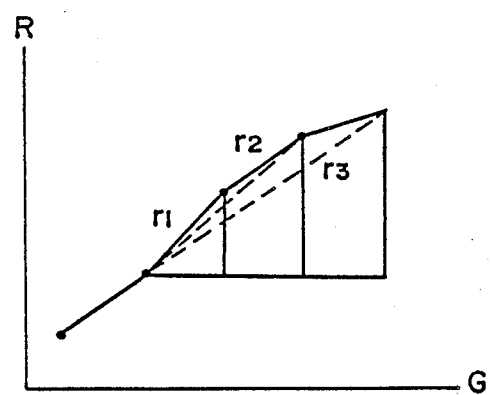
Figure 7C:
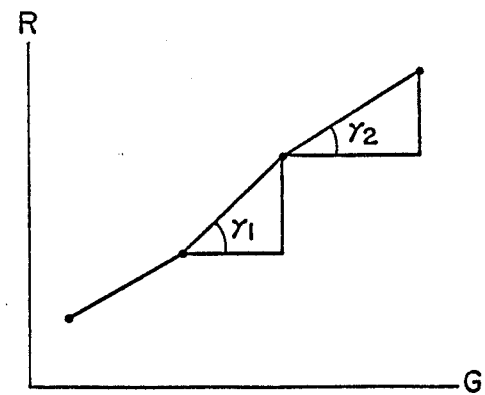

When the characteristics of the film are to be determined from these characteristic curves, a slope $\gamma u$ of an underexposed portion and a slope $\gamma o$ of the overexposed portion may be employed, as shown in, for example, FIG. 7(A). Also, an average value of slopes $((\gamma 1 + \gamma 2 + \gamma 3)/3)$- as shown in FIG. 7(B) or slopes $\gamma 1$ and $\gamma 2$ as shown in FIG. 7(C) may, be employed. It is to be noted that the above description refers to a method of automatically calculating the characteristics of a film by using the film-density storage memory 32 and the film-characteristic determining means 36. However, both means may be omitted, and the requisite film characteristics which are in advance stored in, for example, a film-characteristic memory means may, as required, be read therefrom by the film-type classifying means to be input to the corrected exposure amount determining means 42 and the measurement value selecting means 38.

The corrected exposure amount determining means 42 computes the corrected value of the amount of exposure from the film characteristics of the reference film type and those of the film type to be printed, which film characteristics are selected from the ones determined by the film-characteristic determining means 36. The following description refers to an example in which a slope control ratio $K_{ji}$ of each film type is calculated for correcting the slope control value as the corrected value of the amount of exposure by employing the $\gamma$ value determined by the film-characteristic determining means 36 as the film characteristic.

The slope control ratio $K_{ji}$ of each film type is determined by the following equation from the $\gamma$ value ($\gamma_{jo}$) of the reference film type and the $\gamma$ value ($\gamma_{ji}$) of each film type:

$$K_{ji} = f(\gamma_{ji}, \gamma_{jo}) \qquad (1)$$

where j is one of R, G and B, and i is the type of film ("i =0" represents the reference film type). In equation (1), f represents a function. Therefore, $\gamma_{ji}$ in the above equation (1) represents the slope of the film of the i type, and $\gamma_{jo}$ represents the slope of the reference film type.

The slope control ratio $\gamma_{ji}$ on the basis of the above equation (1) is calculated for each of underexposure and overexposure. The slope control ratio is represented by, for example, the following equations (2) and (3).

$$K_{ji} = a (\gamma_{ji}/\gamma_{jo}) \qquad (2)$$

where a is a constant of 0 to 2.0, preferably, 0.3 to 1.0, which differs among R, G and B.

$$K_{ji} = (1-b) + b(\gamma_{ji}/\gamma_{jo}) \qquad (3)$$

where b is a constant of 0 to 2.0, preferably 0.3 to 1.0, which differs among R, G and B.

Accordingly, the slope control ration $K_{ji}$ can be used to correct the slope control value of films as required for each film type. The slopes shown in FIGS. 7(A) to 7(C) may be employed as slopes which determine the slope control ratio.

The above description refers to an example in which are calculated corrected values for correcting the slope control value. However, an amount $d_j$ of exposure correction may be obtained from the difference between the slope $\gamma_{ji}$ and the slope $\gamma_{jo}$. In addition, the above description refers to an example in which the slope control value and the corrected value of the amount of exposure correction are calculated from the slopes. However, the slope control value and the corrected value of the amount of exposure correction may be calculated by employing the ratio of densities or the difference therebetween.

Figure 8:
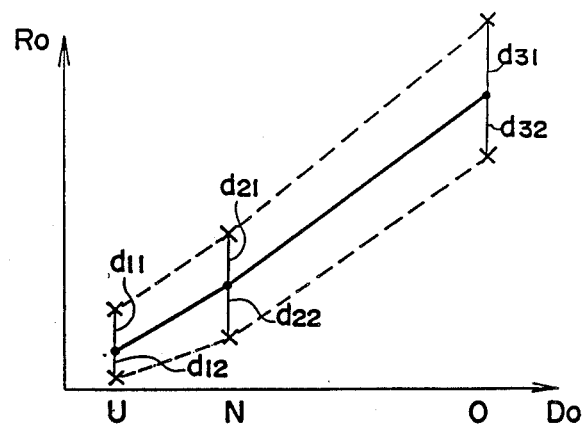
FIG. 8 is a graphic representation of a region within which measurement values are selected.

The measurement value selecting means 38 selects a measurement value which is to be used for the computation of density values for exposure control, and is arranged to select from a measurement value memory a particular measurement value that corresponds to a particular color region, for example, a color region containing a neutral color (gray) and flesh color. The following is a description of a method of extracting data corresponding to a particular color region. First, the curve shown in FIG. 8 that corresponds to each of densities $R_0$, $G_0$ and $B_0$ is formed using the densities $R_0$, $G_0$, $B_0$, $D_0 = (R_0 + G_0 + B_0)/3$ of an average negative film. Furthermore, in order to extract data relative to a region near to the particular color region, offset amounts $d_{11}$, $d_{12}$; $d_{21}$, $d_{22}$; and $d_{31}$, $d_{32}$ relative to each of the above lines are determined in association with each of underexposure, normal exposure and overexposure, to thereby form the region defined by dashed lines in FIG. 8. Then, an average value D of measurement values R, G and B (D $=(R +G +B)/3)$) is calculated, and judgment is made with respect to whether or not the measurement value R relative to the average value D is contained in the region defined by the dashed lines in FIG. 8. Similarly, judgment is made with respect to whether or not the measurement values G and B are also contained in the region defined by the dashed lines in FIG. 8. Only when all the measurement values R, G and B of the three R, G and B colors with respect to the densities $R_0$, $G_0$ and $B_0$ of the average negative film are respectively contained in the regions defined as shown in FIG. 8, the measurement values R, G and B are selectively used for the computation of density values for exposure control. On the other hand, if any one of the measurement values R, G and B is contained in the above-described region, none of the measurement values R, G and B is used for the computation of density values for exposure control, or the average value of the measurement values R, G and B is obtained and used in common for the computation of density values for exposure control. The above offset amounts $d_{11}$ to $d_{32}$ are preferably modified depending upon the type of film or each slope $R_0/D_0$, $G_0/D_0$ and $B_0/D_0$.

Figure 9:
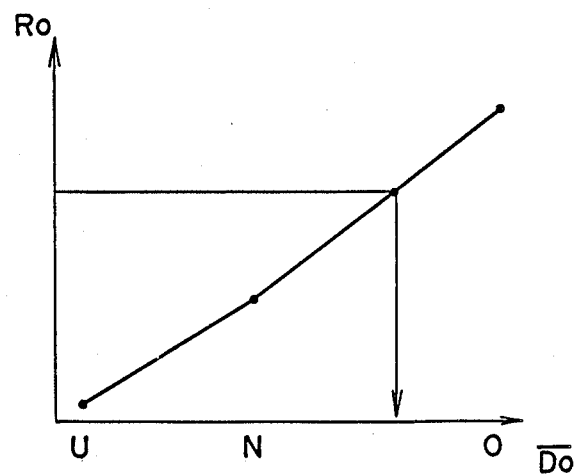
FIG. 9 is a graphic representation of a curve representative of the conversion of measurement values.

The selection of the above measurement values may also be performed as follows. More specifically, the characteristic curves illustrated in FIG. 8 are determined as shown in FIG. 9 with respect to the densities $R_0$, $G_0$ and $B_0$ of an average negative film, and these characteristic curves are employed to convert the measurement values R, G and B to the value $D_0$ by means of a method such as that described in Japanese Patent Laid-open No. 27352/1985 to thereby obtain values $R'$, $G'$ and $B'$. By this conversion, measurement values having the same color balance as the average negative film are converted to equal densities $R'$, $G'$ and $B'$. Then, with reference to a chromaticity diagram, judgment is made with respect to whether or not these densities $R'$, $G'$ and $B'$ are used for the computation of density values for exposure control. It is to be noted that the selection of measurement values may include a process for selectively weighting measurement values, such as that disclosed in Japanese Patent Laid-open No. 198144/1986 or 223731/1986.

The exposure control value computing means 40 performs calculations upon density values for exposure control by using the measurement values selected by the measurement value selecting means 38. The measurement values are classified by a method such as that described in Japanese Patent Laid-open No. 198144/1986, 223731/1986, or 232442/1986 and the exposure control value computing means 40 computes the density values for exposure control from the density values calculated on the basis of the classified values.

Figure 10:
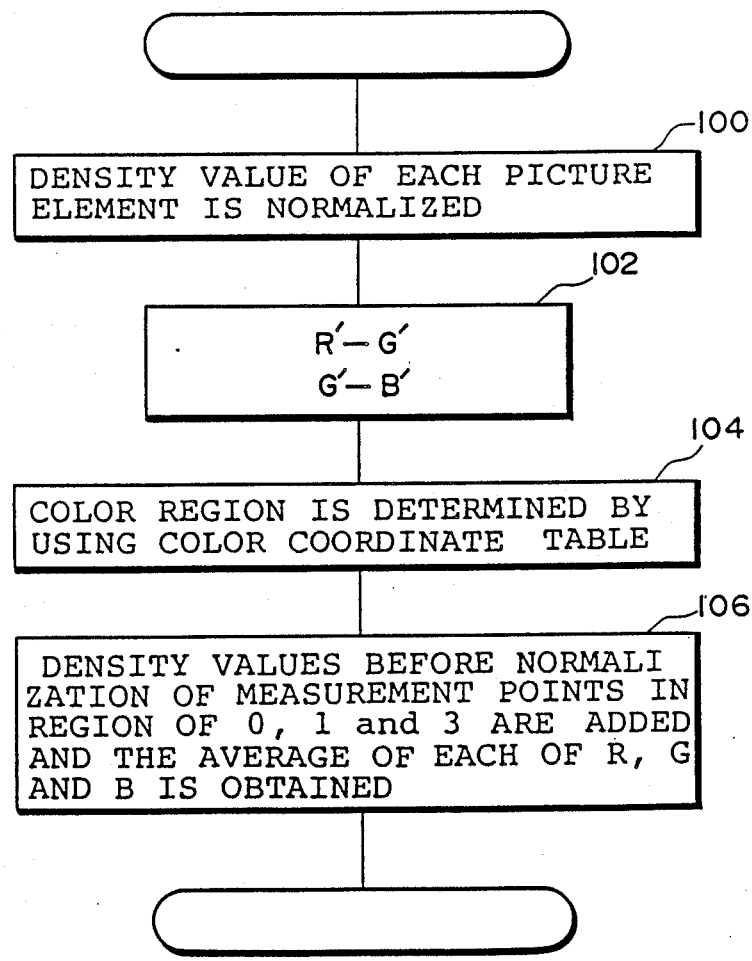
FIG. 10 is a flow chart of a process for calculating a density value for exposure control.

More specifically, as shown in FIG. 10, in Step 100, a point corresponding to a particular color region is set as the origin to perform normalization of the density value of each picture element. In the next Step 102, the density values $R'$, $G'$ and $B'$ which have been normalized are used to compute $R'-G'$ and $G'-B'$. In Step 104, color regions such as those shown in FIG. 11 are determined with respect to individual color measuring points from a color coordinate table, and selection is made with respect to colors containing neutral colors or flesh color in a closed region on the color coordinates or measurement points belonging to the regions of the colors containing the neutral colors or the flesh color in the closed region on the color coordinates (for example, the regions represented by 0s (neutral colors), 1 and 3 (flesh color), respectively). (The above selection is made by the measurement value selecting means). The density values of the selected measurement points prior to normalization are added and the average value of each of R, G and B is calculated. These average values are used as the density values for exposure control. In addition, the measurement values corresponding to a region outside of the aforesaid particular color region may be converted into an average value of the three colors, and may be used in common as a density value for exposure control of the three colors. Since the density values for exposure control do not contain any density values which may cause color failure, they can be used to determine the amount of exposure without deteriorating the effect of color correction.

The exposure amount determining means 44 determines the amount of exposure by using the printing condition of the reference film type which are stored in the printing condition memory 48, the density values for exposure control which are computed by the exposure control computing means 40 and the corrected values of the amount of exposure which are computed by the corrected exposure amount determining means 42. If a slope control ratio is used as the corrected value of the amount of exposure, the amount of exposure is computed in accordance with the following equation:

$$\log E_{ji} = K_{ji} \cdot S_{jo} \cdot C_j \cdot (D_{ji} - D_{jon}) + F_j + d_{ji} \quad (4)$$

where $E_{ji}$: the amount of exposure, $F_j$: the constant determined by the kinds of color paper and automatic color photographic printing apparatus employed, $d_{ji}$: the corrected amount of exposure based on the contents of an image, $D_{jon}$: the density value for exposure control of a reference image in the reference film type $(F_o)$, $D_{ji}$: the density value for exposure control of the film of the i type, $C_j$: the color correction coefficient ($\approx 1.0$)

j: one of R, G and B, i: the type of film (the reference film type when i = 0), $S_{jo}$: the slope control coefficient (= 0.5 to 2.0)

$$\begin{cases} \text{an under-slope control coefficient when } D_{ji} - D_{jon} < 0 \\ \text{an over-slope control coefficient when } D_{ji} - D_{jon} \geq 0, \text{ and} \end{cases}$$

$K_{ji}$: the slope control ratio (= 0.5 to 2.0), $$\begin{cases} \text{an under-slope control ratio when } D_{ji} - D_{jon} < 0 \\ \text{an over-slope control ratio when } D_{ji} - D_{jon} \geq 0 \end{cases}$$

More specifically, the above equation (4) becomes the following equation (5):

$$\begin{bmatrix} \log E_{Ri} \\ \log E_{Gi} \\ \log E_{Bi} \end{bmatrix} = \begin{bmatrix} K_{Ri} & 0 & 0 \\ 0 & K_{Gi} & 0 \\ 0 & 0 & K_{Bi} \end{bmatrix} \cdot \begin{bmatrix} S_{RO} & 0 & 0 \\ 0 & S_{GO} & 0 \\ 0 & 0 & S_{BO} \end{bmatrix} \cdot \begin{bmatrix} C_{11} & C_{12} & C_{13} \\ C_{21} & C_{22} & C_{23} \\ C_{31} & C_{32} & C_{33} \end{bmatrix} \cdot \begin{bmatrix} D_{Ri} - D_{RON} \\ D_{Gi} - D_{GON} \\ D_{Bi} - D_{BON} \end{bmatrix} + \begin{bmatrix} K_R \\ K_G \\ K_B \end{bmatrix} + \begin{bmatrix} d_R \\ d_G \\ d_B \end{bmatrix} \quad (5)$$

Figure 12:
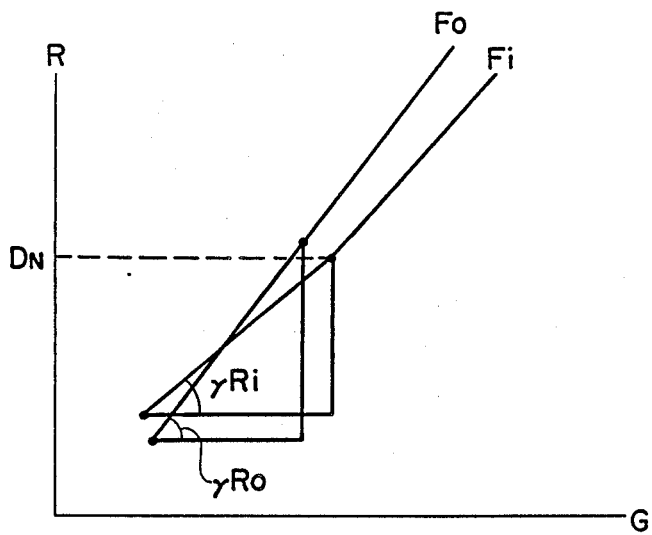
FIG. 12 is a graphic representation of the curves of the R characteristic curves of two types of film.

The above description refers to an example in which the amount of exposure is computed by using the corrected values computed by the corrected exposure amount determining means. However, the corrected exposure amount determining means may be omitted, and the film characteristic determining means may be connected directly to the exposure control value computing means so that density values for exposure control may be computed by directly using the difference in film characteristic. More specifically, since the R density $D_i$ of a film $F_i$ of the i type assumes the relationship shown in FIG. 12 with respect to the film $F_o$ of the reference type, the density $D_i$ is converted as shown by the following equation (6) when the density $D_i$ is smaller than an average density $D_N$:

$$D'_i = D_N - K(\gamma_{jo}/\gamma_{ji})(D_N - D_i) \quad (6)$$

where $j=R$, $\gamma_{jo}$ is the slope of the reference film type, $\gamma_{ji}$ is the slope of the film of the i type, and K is a constant (which may be altered in accordance with the type of film employed).

The value $D'_i$ which is converted by the above equation (6) is used as the density value for exposure control of the film $F_i$ of the i type. It is to be noted that, in general, the equation (6) may be represented by the following equation (7):

$$D'_{ji} = g_j(\gamma_{ji}, \gamma_{jo}, D_{ij}) \quad (7)$$

As described above, since the characteristic curve of the i-type film is corrected by the equation (6) when $D_i < D_N$, the characteristic curve of the reference film type and that of the i-type film become approximately parallel to each other. Therefore, the i-type film can be printed in accordance with the printing condition of the reference film type.

Although the above description refers to an example in which R and B are corrected on the basis of G, such correction may be performed on the basis of the value of $(R + G + B)/3$.

Figure 14A:
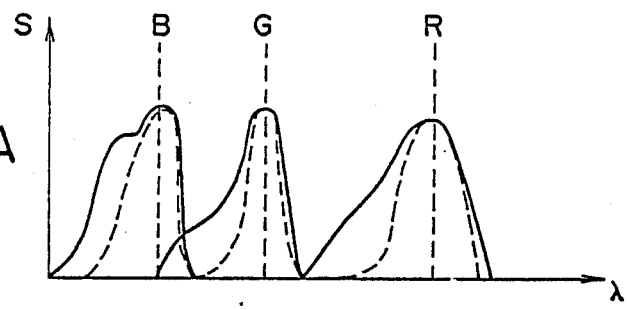
FIGS. 14(A), 14(B) and 14(C) are charts respectively showning the characteristics or the like of color paper and the distribution of the spectral sensitivity of a two-dimensional image sensor in a subtractive color process.

The following is a description of a second embodiment of the present invention which is applied to an automatic color photographic printing apparatus of a white-light subtractive-color-process type. In FIG. 13, like reference numerals are used to denote the like or corresponding parts shown in Fig. 1, and the description thereof is omitted. As illustrated, in the white-light subtractive-color-process type of automatic color photographic printing apparatus, a light control filter device 60 and a color light limiting filter device 62 are arranged between the lamp house 10 and the mirror box 18. As is known, the light control filter device 60 is constituted by the three filters of a Y (yellow) filter, an M (magenta) filter and a C (cyan) filter. The color light limiting filter device 62 is constituted by the following four filters: a BG limiting filter a (a first limiting filter) which is constituted by a dielectric multilayer film for cutting off the long waves of blue (B) light and the short waves of green (G) light, a GR limiting filter b (a second limiting filter) which is similarly constituted by a dielectric multilayer film for cutting off the long waves of G light and the short waves of R light, an ultraviolet cutoff filter c, and an infrared cutoff filter d. In the color light limiting filter device 62, the B light (a BL portion marked with inclined lines in FIG. 14(C) is formed by a combination of the ultraviolet cutoff filter c and the BG limiting filter a, the G light (a GL portion marked with inclined lines in FIG. 14(C) is formed by a combination of the BG limiting filter a and the GR limiting filter b, and the R light (a RL portion marked with inclined lines in FIG. 14(C) is formed by a combination of the infrared cutoff filter d and the GR limiting filter b. The transmittance characteristics of the above-described color light limiting filter 62 are as shown in FIG. 14(C). It is to be noted that, in place of the ultraviolet cutoff filter, ultraviolet rays may be cut off by a reflector of a light source portion. Similarly, in place of the infrared cutoff filter, infrared rays may be cut off by the reflector of the light source portion. Accordingly, the present invention may also include a mirror having a reflectivity represented by c or d in FIG. 14(C).

Figure 14B:
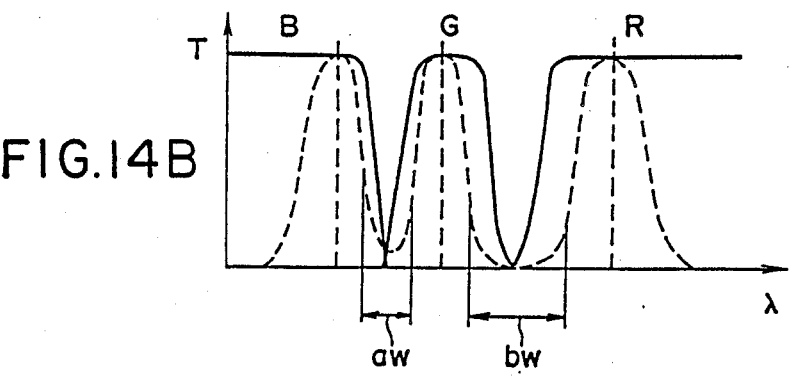
Figure 14C:
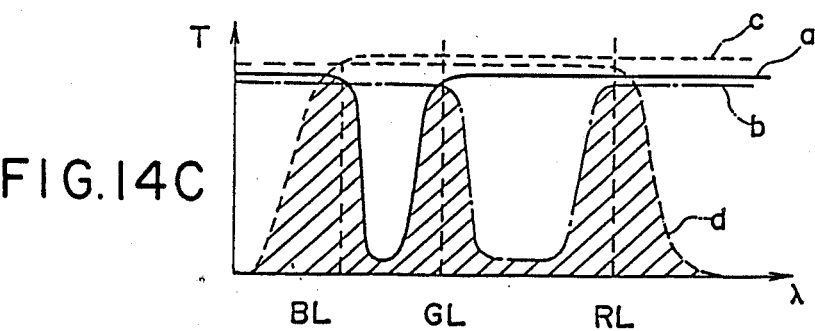

The following filters are used in the two-dimensional image sensor: a B filter having a transmittance long-wave edge in the absorption band of the BG limiting filter a (the range represented by an arrow aw in FIG. 14(B); a G filter having a transmittance short-wave edge in the absorption band aw of the BG limiting filter a and having a transmittance long-wave edge in the absorption band of the GR limiting filter b (the range represented by an arrow bw in FIG. 14(B); and an R filter having a transmittance short-wave edge in the absorption band bw of the GR limiting filter b. The transmittance characteristics of the R, G and B filters are as shown by solid lines in FIG. 14(B), and are preferably constituted by dielectric multilayer film. The transmittance distribution when the R, G and B filters are combined with the color light limiting filter device 62 is as shown by a dashed line in FIG. 14(B). The R, G and B filters are used in such a manner that each color is arranged like a mosaic pattern or a stripe pattern as disclosed in Japanese Patent Application No. 22155/1986 or a checked pattern. As described above, if the R, G and B filters having such simple characteristics and dedicated for use with sensors are employed with the sensor, it is possible to relatively easily produce two-dimensional color image sensors. If the light transmitted through the color light limiting filter device is made to illuminate the two-dimensional color image sensor, it is possible to provide coincidence in spectral sensitivity distribution between the light measuring system and the exposure system by illuminating the two-dimensional image sensor with light transmitted through the color light limiting filter. In general, two-dimensional color image sensors having R, G and B spectral sensitivity distributions as shown by solid lines or dashed lines in FIG. 14(A) are extremely difficult to produce with high precision and good reproducibility by means of current filter production techniques. However, the spectral density of color paper which is corrected by the color light limiting filter device 62 is as shown by the solid lines in FIG. 14(A) when compared with the spectral sensitivity of the color paper before correction (represented by the solid lines in the same figure), and approximately coincides with the spectral sensitivity distribution of the light measuring system shown in FIG. 14(B). A light measuring device of a type which effects color separation by using three sensors which will be described later employs for the purpose of color separation at least two dichroic mirrors having B, G and R reflectivity characteristics which correspond to the transmittance characteristics of B, G and R shown in FIG. 14(B). The present invention covers this arrangement as well.

After the spectral sensitivity distributions are made to coincide with each other, light is measured by utilizing the color light limiting filter, the printing condition of the negative film of the reference type is modified, and then printing is effected by utilizing the Y, M and C filters. In this manner, a white-light subtractive color process can be used to make good prints from films of various types each having a different characteristic. Even if the light measuring system and the exposure measuring system are arranged separately, the present invention can of course be applied to white-light subtractive-color-process printing.

It is to be noted that, in a light measuring operation, the color light limiting filter device 62 is inserted in the optical path in place of the light control filter device 60. The construction of the remaining portion is identical with that of the first embodiment, and the description thereof is omitted.

Figure 15:
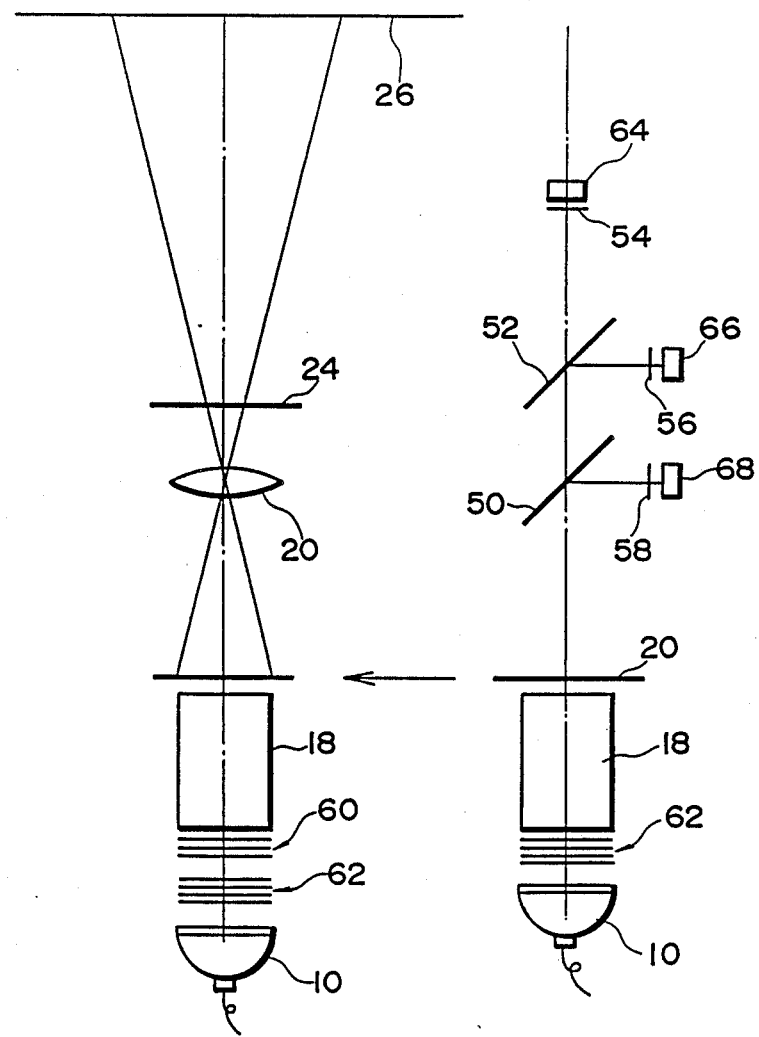
FIG. 15 is a schematic diagram showing a third embodiment of the present invention which is applied to a white-light subtractive-color type color photographic printing apparatus in which a light measuring section and a printing section are separated from each other.

FIG. 15 shows a subtractive-color type of color photographic printing apparatus according to a third embodiment in which a light measuring section and an exposure section are arranged separately. In FIG. 15. like reference numerals are used to denote the like or corresponding parts shown in FIG. 2, and the description thereof is omitted.

The light measuring section of the printing apparatus is provided with dichroic mirrors 50 and 52, a G sensitivity compensating filter 54, an R sensitivity compensating filter 56, a B sensitivity compensating filter 58, and line sensors 64, 66 and 68 for measuring light transmitted through the filters 54, 56 and 58, respectively. The reflection characteristics of the dichroic mirrors 50 and 52 respectively correspond to the characteristics of B and R shown in FIG. 14(B). The B, G and R sensitivity compensating filters 54, 56 and 58 may have the transmittance characteristics of B, G and R shown in FIG. 14(B).

Figure 16:
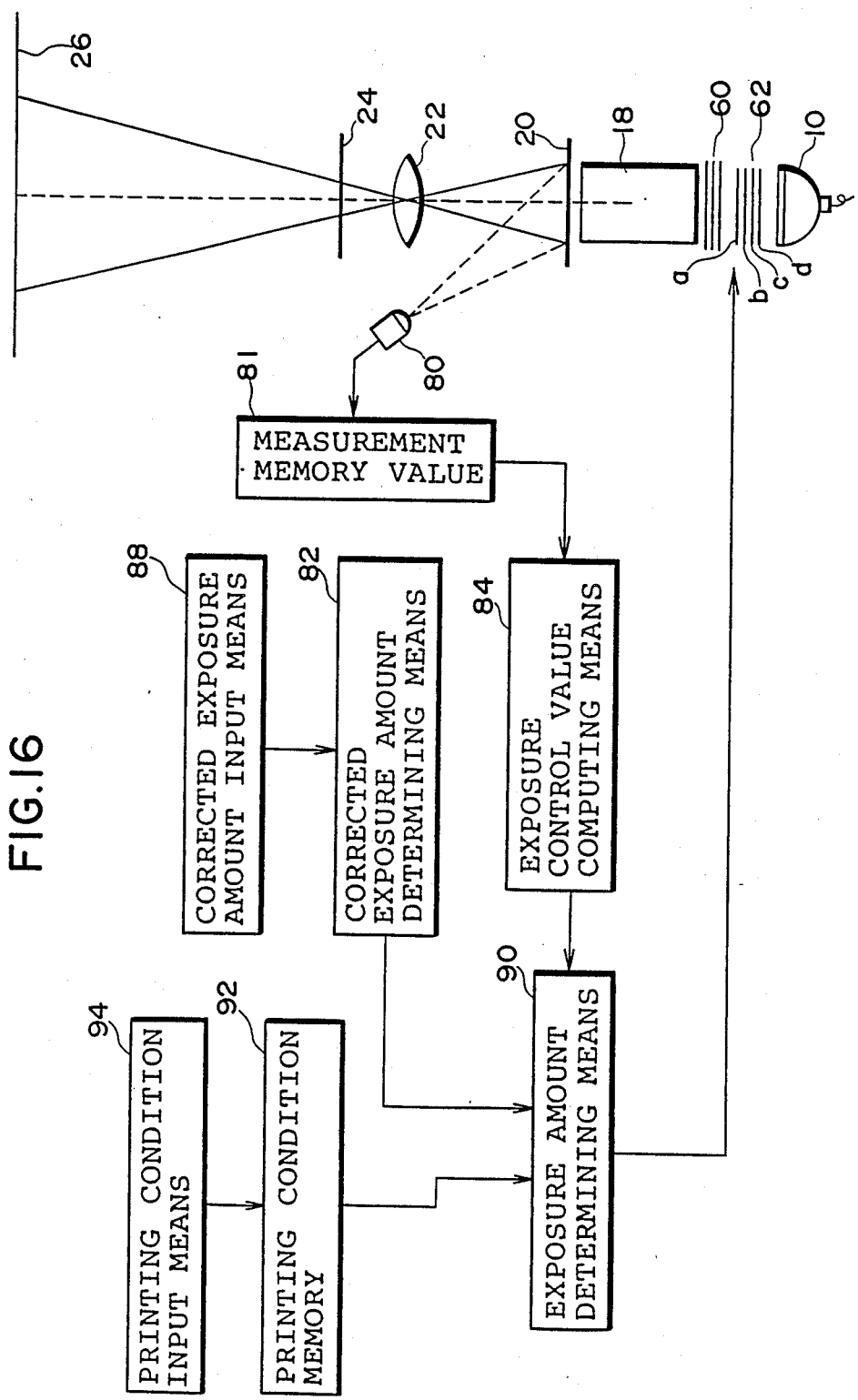
FIG. 16 is a schematic diagram showing a color photographic printing apparatus according to a fourth embodiment of the present invention.

A fourth embodiment of the present invention will be described below with reference to FIG. 16. The construction of a subtractive-color type of automatic color photographic printing apparatus according to the fourth embodiment is substantially identical with that of the second embodiment, except for the light measuring system according to the fourth embodiment. Therefore, like reference numerals are used to denote the like or corresponding constituent parts used in the second embodiments, and the description thereof is omitted.

A light measuring device 80 provided with at least one photosensitive element capable of receiving light of each of the three colors R, G and B is arranged on the axis parallel to the direction inclined with respect to the optical axis of a focusing optical system and at a location which enables measurement of the density of an image in the negative film 20.

The light measuring device 80 is connected to a measurement value memory 81 for storing the density signals output from the light measuring device 80. The measurement value memory 81 is connected to an exposure control value computing means 84. A corrected exposure amount determining means 82 is connected to a corrected exposure amount input means 88.

The results of computations by the corrected exposure value determining means 82 and the exposure control value computing means 84 are supplied to an exposure amount determining means 90. A printing condition input means 94 is also connected to the exposure amount determining means 90 through a printing condition memory 92. The exposure amount determining means 90 outputs exposure control signals on the basis of the amount of exposure determined by the exposure amount determining means 90. A drive system (not shown) for each filter is controlled by the exposure control signals so that the amount of exposure for printing is controlled.

The operation of the fourth embodiment will be described below.

Light transmitted through the negative film 20 is measured by the light measuring device 80, and the resulting value is stored in the measurement value memory 81. The measurement value memory 81 supplies the density value of each of the three colors R, G and B to the exposure control value computing means 84, which computes an exposure control value and supplies it to the exposure amount determining means 90. An exposure correction signal is input to the corrected exposure amount determining means 82 by means of the corrected exposure value input means 88. On the basis of the signals, the corrected value of the amount of exposure is determined and output to the exposure amount determining means 90.

The exposure amount determining means 90 calculates the period required for the filter device 60 to be located on the optical axis or the duration required for each filter thereof to be located on the same, that is, the amount of exposure.from the exposure control value and the corrected value of the amount of exposure, and thus controls the drive system to effect exposure of the color paper 26.

As described above, since the sensitivity of the light measuring system and that of the exposure system are determined by the color light limiting filter device 62 constituted by the four color filters, it is possible to accurately measure the density of each color and hence to provide a proper amount of exposure.

Another type of light measuring device (the two-dimensional color image sensor 28 shown in, for example, FIG. 13) may be employed in place of the light measuring device 80, and a corrected value of the amount of exposure may be automatically determined by the corrected exposure amount determining means 82 without the need to employ the corrected exposure amount input means 88.

In the second and fourth embodiments, the color separation filters (a B filter, a G filter and an R filter) used in the light measuring device each have a wavelength edge which is conditioned as follows.

B filter:

(1) Its transmittance long-wave edge is contained in the absorption band of the BG limiting filter a.

G filter:

(1) Its transmittance short-wave edge is contained in the BG limiting filter a.

(2) Its transmittance long-wave edge is contained in the GR limiting filter b.

R filter:

(1) Its transmittance short-wave edge is contained in the GR limiting filter b.

As illustrated previously in the description of the above embodiment, the spectral sensitivities of the light measuring system and the exposure system can be made to coincide with each other by conditioning the wavelength edges of the respective color separation filter. The present inventors carried out a large number of experiments with respect to conditions which limit the coincidence, and found out that, even if the wavelength edge of each color separation filter is contained in the aforesaid absorption band, the exposure process is not affected if the error is within a predetermined range. More specifically, the following conditions are applicable as the condition of the wavelength edge of each color separation.

B filter:

(1) Its transmittance long-wave edge is contained in the absorption band of the BG limiting filter a.

(2) The transmittance long-wave edge is contained in the range between the short-wave edge of the absorption wavelength band of the BG limiting filter and a wavelength which is shorter by a maximum of 7 nm than the short-wave edge.

G filter:

(1) Its transmittance short-wave edge is contained in the absorption band of the BG limiting filter a.

(2) Its transmittance long-wave edge is contained in the absorption band of the GR limiting filter b.

(3) The transmittance short-wave edge is contained in the range between the long-wave edge of the absorption wavelength band of the BG limiting filter a and a wavelength which is longer by a maximum of 7 nm than the long-wave edge.

(4) The transmittance long-wave edge is contained in the range between the short-wave edge of the absorption wavelength band of the GR limiting filter b and a wavelength which is shorter by a maximum of 7 nm than the short-wave edge.

R filter:

(1) Its transmittance short-wave edge is contained in the absorption band of the GR limiting filter b.

(2) The transmittance short-wave edge is contained in the range between the long-wave edge of the absorption wavelength of the GR limiting filter b and a wavelength which is longer by a maximum of 7 nm than the long-wave edge.

Figure 17:
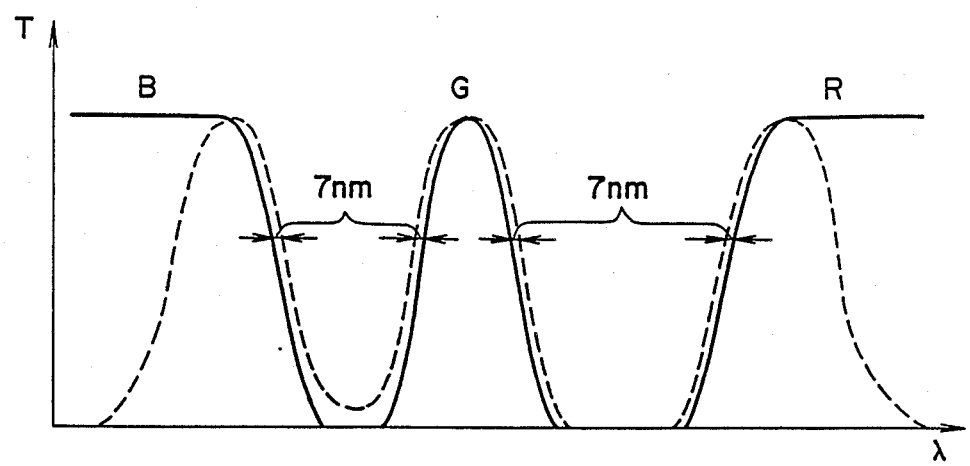
FIG. 17 is a graphic representation of the spectral distribution according to the fourth embodiment.
Figure 18:
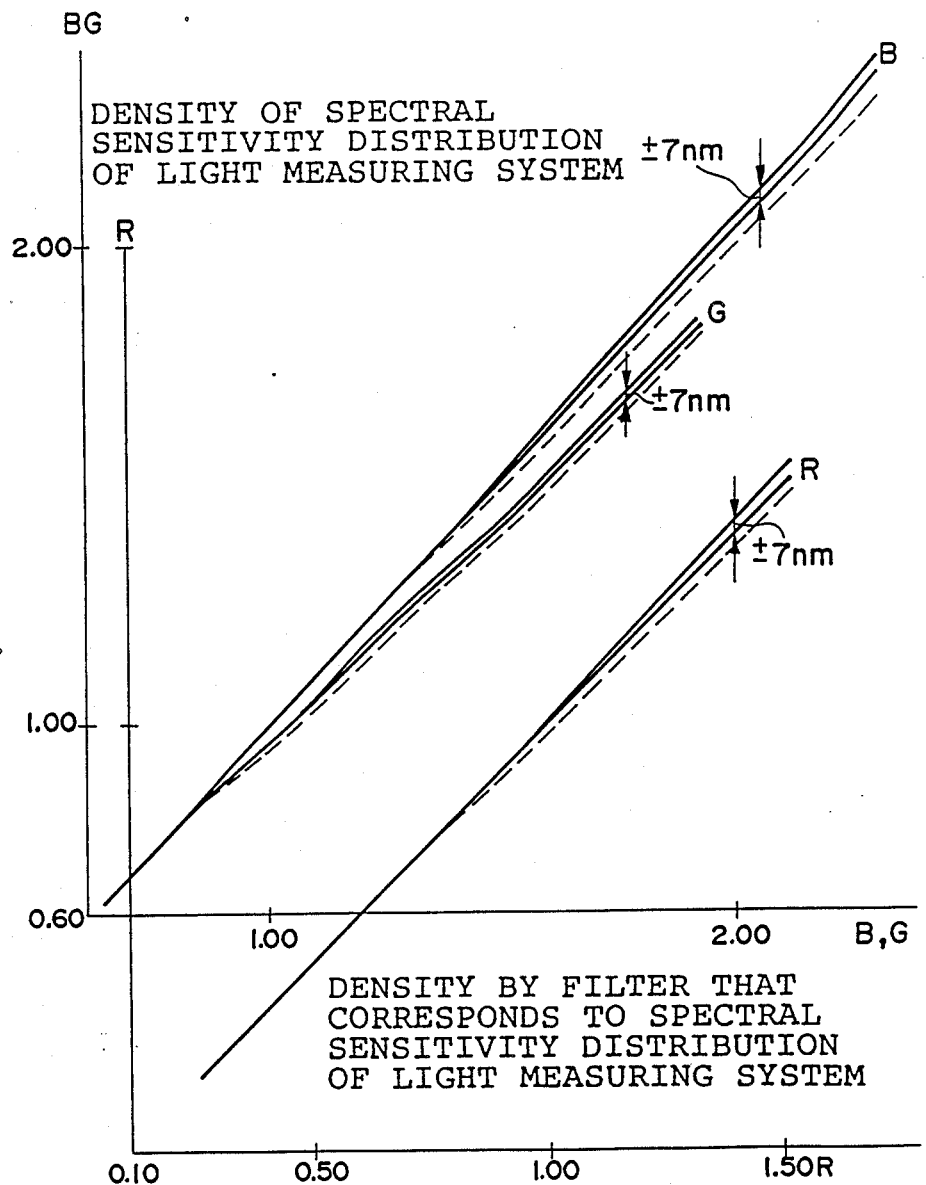
FIG. 18 is a characteristic chart showing the difference in density distribution.

The above-described predetermined ranges are obtained from the experimental results, and the spectral sensitivity distribution is as shown in FIG. 17. If density values obtained by the light measuring device 80 having the spectral sensitivity distribution limited in this manner are compared with virtual density values provided by filters that correspond to the spectral sensitivity distribution of the color paper 26 used in this embodiment, as shown in FIG. 18, the error of 7 nm, which is a maximum of about 0.03 in terms of density values, does not substantially influence the amount of exposure.

Although the above conditions of the respective color light limiting filters are determined in accordance with the positions of the sensitivity wavelength edges, the conditions may be determined by a half-width of the spectral distribution of each of the three colors.

More specifically, since the transmittance short-wave edge of the BL portion is determined by the ultraviolet cutoff filter, a half-width which is 50 nm less than the transmittance short-wave edge is set as a transmittance short-wave edge so that the previously described conditions may be realized.

In the GL portion, a half-width is less than 40 nm so that the above condition may be set. In addition, since the transmittance long-wave edge of the R filter is determined by the infrared cutoff filter, a half-width which is 60 nm less than the transmittance long-wave edge is set as a transmittance short-wave edge and the above-described so that the above conditions may be realized.

Thus, the spectral sensitivity distributions of the light measuring system and the exposure system easily coincide with each other, and proper exposure control can be performed.

It is to be noted that the smaller the above-described half-widths, the less the influence of the spectral distributions of the color separation filters. Therefore, if possible, it is preferable that the half-widths of the BL portion be, the GL portion and the RL portion be less than 40 nm, less than 30 nm and less than 50 nm, respectively.

As described above, with the present embodiment, it is possible to make good prints from various types of films by correcting the printing condition of the reference film type in accordance with the characteristics of the film types. Therefore, if the printing condition of the reference film type is determined, it is possible to make high-quality prints from various types of films irrespective of whether they are underexposed or overexposed. Furthermore, since various types of films are printed with reference to the printing condition of the reference film type, even if there are any variations in the various characteristics of a negative film processing machine, a negative film, an automatic color photographic printing apparatus and the like, all that is required is to control a single type of printing condition, that is, the printing condition of the reference film type, whereby it is possible to easily provide proper control. Moreover, since a proper condition for each film type is automatically modified, good prints can be made from the various types of films.

It is to be noted, in the present invention, a switch may be provided for selecting either a method of effecting printing by automatically determining the amount of correction of the printing condition or corrected printing condition with respect to each type of film on the basis of the printing condition of the reference film type or a method of determining printing condition or corrected printing condition for each type of film with respect to the reference printing condition on the basis of printing. In this case, the corrected printing condition may be previously stored in an IC card or an LSI card, and may be read by the film-type classifying means. As described above, it is considered that various conventional systems or methods can be combined with the present invention. However, it will be understood that all such combinations are merely modified or applied forms of the present invention.

A fifth embodiment of the present invention will be now described in detail.

In the following description, like reference numerals are used to denote the like or corresponding parts used in the first embodiment, and the description thereof is omitted.

Figure 19:
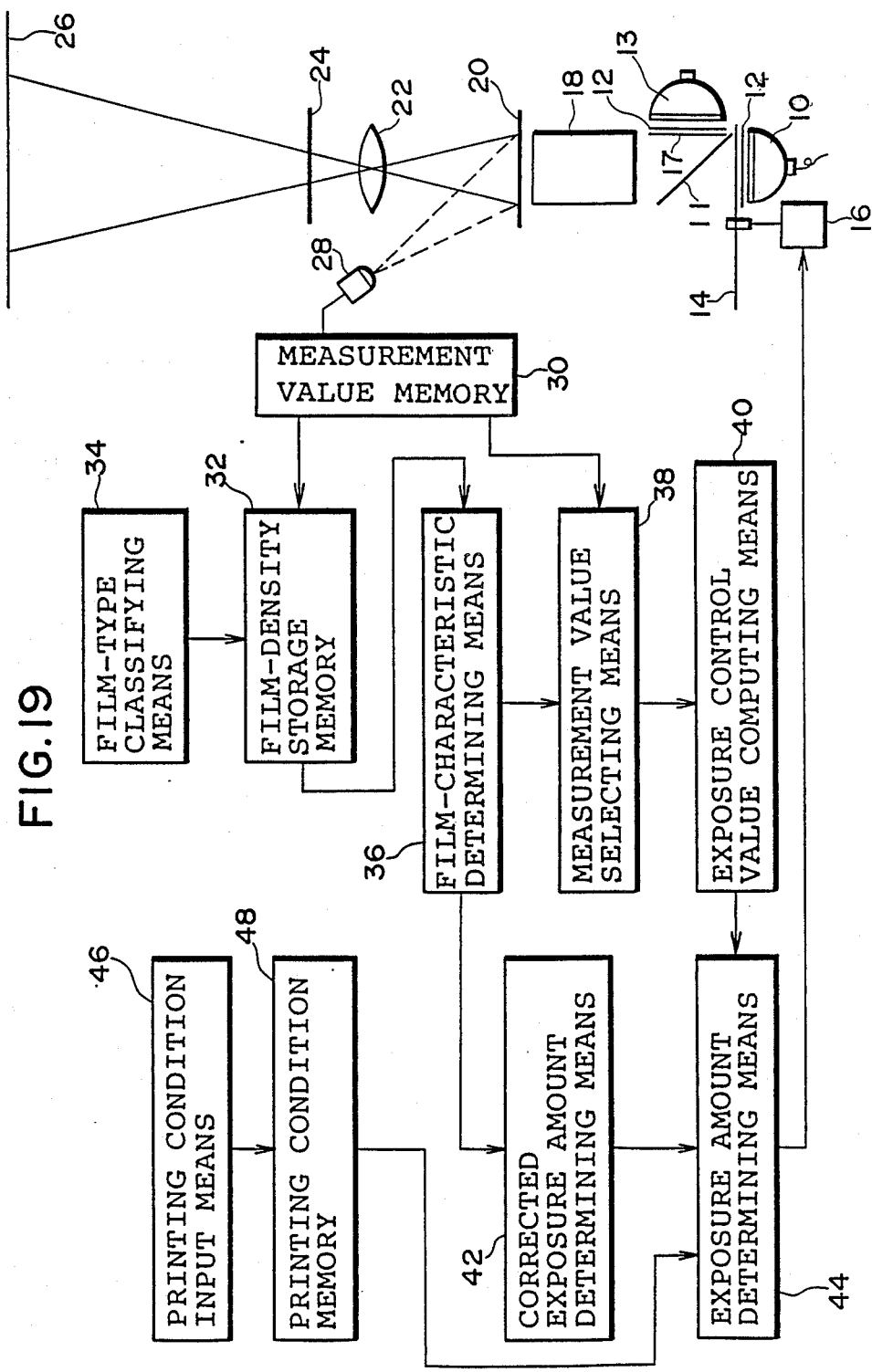
FIG. 19 is a schematic diagram showing a fifth embodiment of the present invention which is applied to a additive-color type of color photographic printing apparatus.

As shown in FIG. 19, the mirror box 18, the dichroic mirror 11 and the lamp house 10 provided with a halogen lamp are arranged in this order. A lamp house 13 having a construction identical with that of the lamp house 10 is disposed in the vicinity of the lamp house 10. The rotating disk 14 rotated by the motor 16 as well as the infrared cutoff filter 12 is inserted into the dichroic mirror 11 and the lamp house 10. An R (red) filter 17 as a red-light separation filter and the infrared cutoff filter 12 are inserted between the dichroic mirror 11 and the lamp house 13. The dichroic mirror 11 has characteristics which are determined so as to reflect R light and to transmit G (green) and B (blue) light.

Figure 20:
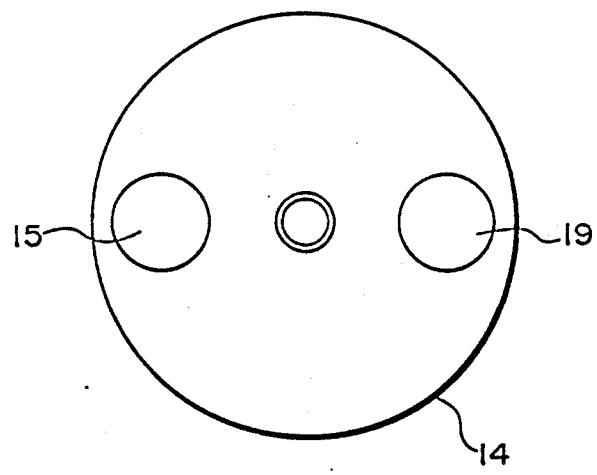
FIG. 20 is a top plan view of the rotating disk shown in FIG. 19.
Figure 21A:
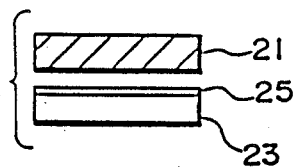
FIGS. 21(1), 21(2), 21(3) is a schematic cross sectional view of examples of the filter shown in FIG. 20.

As shown in FIG. 20, the rotating disk 14 is provided with a color separation filter constituted by the G (green) filter 15, the B (blue) filter 17 and the R (red) filter 19 which are disposed around the circumference of the rotating disk 14. Each of the G filter 15, the B filter 17 and the R filter 19 are, as shown in FIG. 21(A), constituted by the white glass 23 coated with the dielectric multilayer film 25 and of the color glass 21 of R, G and B, respectively, with the color glass 21 being parallel to the white glass 23. Since the infrared cutoff filter 12 is normally located on the side of the lamp house 10 with the R filter 17 being located on the side of the lamp house 13, there is a risk that the filters 12 and 17 may be thermally unstable immediately after the lamp houses 10 and 13 have been turned on. Also, since the G filter 15 and the B filter 19 are sequentially located above the lamp house 10 by the rotation of the rotating disk 14, there is a risk that these filters may be thermally unstable when inserted between the mirror box 18 and the lamp house 10. Incidentally, the characteristics of the R filter of this embodiment is identical with those of the R filter of the first embodiment (FIG. 4), and the description thereof is omitted.

Figure 21B:
Figure 21C:
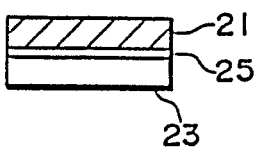

As shown in FIG. 21(B), each of the G filter 15, the B filter 17 and the R filter 19 may be constituted by the color glass 21 having a surface coated with the dielectric multilayer film 25. In addition, as shown in FIG. 21 (C), the dielectric multilayer film 25 may be hermetically sandwiched between a white plate glass 23 and a color glass 21 by an adhesive. In this adhesion, it is preferable to use a heat-resistant adhesive.

Referring back to FIG. 19, the lens 22, the black shutter 24 and a sheet of the color paper 26 are arranged in this order above the negative film 20. The light rays emitted by the lamp house 10 are transmitted through the infrared cutoff filter 12, the filters of the rotating disk 14 and the dichroic mirror 11 into the mirror box 18, while the light rays emitted by the lamp house 13 are transmitted through the infrared cutoff filter 12, the R filter 17 and the dichroic mirror 11 into the same mirror box 18. Light from the mirror box 18 is transmitted through the negative film 20, and is focused on the color paper 26 by the lens 22. Therefore, the R light and the B light or the R light and the G light are simultaneously projected onto the negative film 20 and light measuring and exposure to light is performed. This embodiment is to illustrate that the present invention is applicable to an apparatus which can simultaneously measure at least two colors and expose a color paper to them.

The two-dimensional image sensor 28 as a light measuring device is disposed on an axis parallel to the direction inclined with respect to the optical axis of the aforesaid focusing optical system and at a location which allows measurement of the density of an image in the negative film 20. The two-dimensional image sensor 28 is provided with the storage type photoelectric conversion device such as a CCD or a MOS, an optical system for focusing an image in the negative film 20 on the photoelectric conversion device, and signal processing circuit for processing the output of the photoelectric conversion device and outputting the processed signals as image information. The signal processing circuit converts the output of the photoelectric conversion device into digital signal, then effects logarithmic conversion of the reciprocal of the digital signal, and then outputs the thus-obtained signal as a density signal. As described above, since the two-dimensional filter 28 is simultaneously illuminated by the two colors of the R light and the B light or the R light and the G light, the two-dimensional filter 28 has a color separation filter device capable of measuring the two colors at the same time. Preferably, the color separation filter device has a spectral transmittance characteristic wider than that of the previously-described color separation filter used in the light source portion and essentially has characteristics which allow measurement of light without influencing the spectral distribution characteristics of the R, G and B light. In other words, a wide distribution of spectral sensitivities or a spectral sensitivity distrition approximate to a block-shaped distribution is desirable.

The light measuring device may be constituted by a photoelectric conversion device provided with a color separation filter having the above-described characteristics which allow transmission of the R, G and B light, in addition to or in place of the two-dimensional image sensor, and capable of effecting averaged light measurement in a filter plane.

Figure 22A:
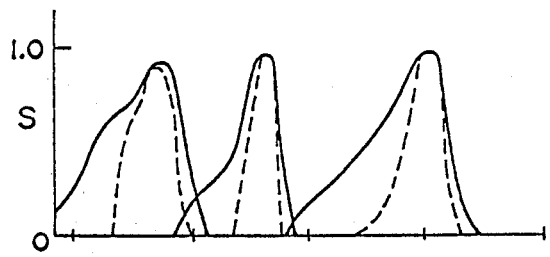
FIGS. 22(A), 22(B) and 22(C) are charts respectively showing the characteristics or the like of color paper and the distribution of the spectral sensitivity of a two-dimensional image sensor in the fifth embodiment.
Figure 22B:
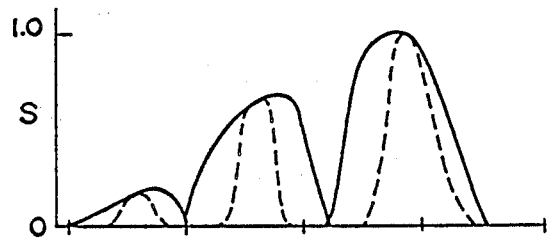
Figure 22C:
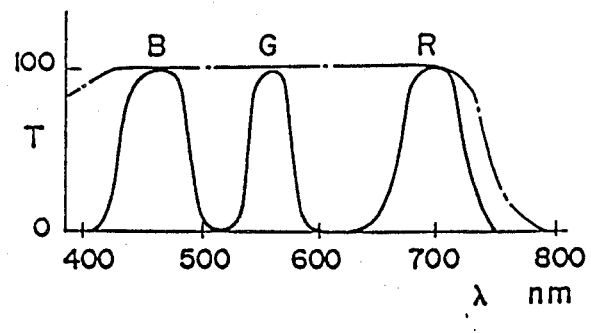
Figure 23A:
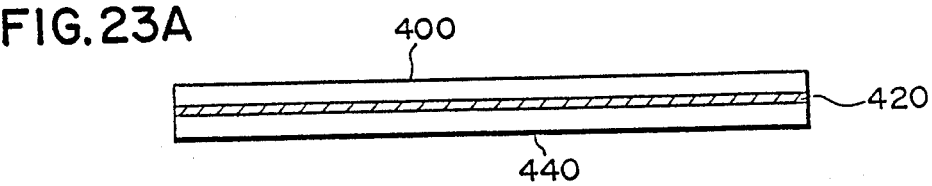
FIGS. 23(A) to 23(D) are schematic cross sectional views of examples of a color filter according to the present invention; constructions of examples of color photographic printing apparatus according to the present invention.
Figure 23B:
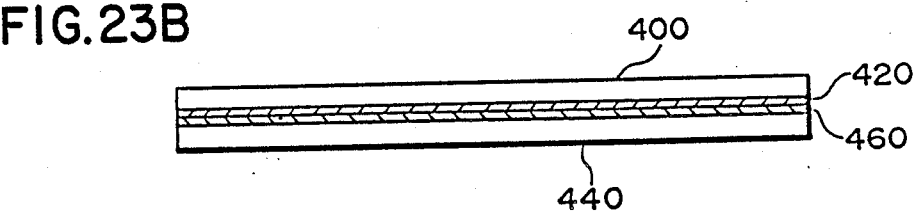
Figure 23C:
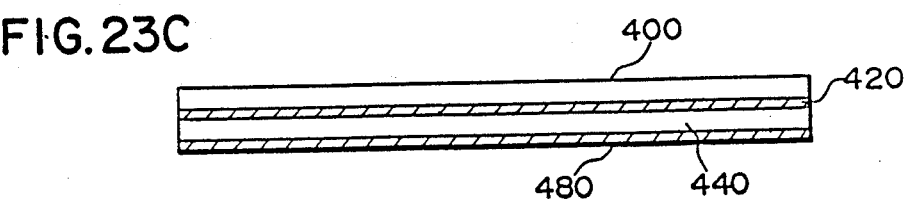
Figure 23D:
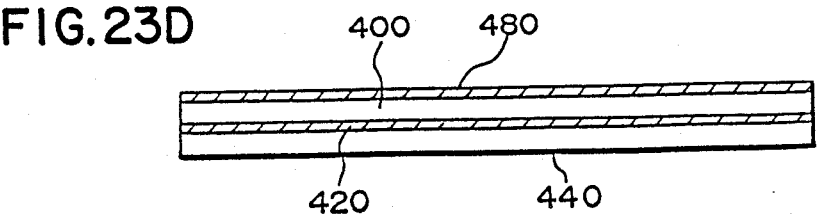

The characteristic of the infrared cutoff filter 12 is as shown by one-dot chain lines in FIG. 22(C), and the relative spectral transmittance of the three color separation filter device for B, G and R is as shown by solid lines in FIG. 22(C). The relative sensitivity distribution of the two-dimensional image sensor 28 combined with a light measuring color separation filter is as shown by solid lines in FIG. 22(B) and, since the spectral energy distribution of the R, G and B light is sufficiently sharper than the transmittance distribution of the light measuring color separation filter, the effective spectral sensitivity distribution of the two-dimensional image sensor 28 in an additive color process is as shown by dashed lines in FIG. 22(B). The relative spectral sensitivity distribution of the color paper is as shown by solid lines in FIG. 22 (A), and the spectral sensitivity distribution of the color paper in the additive color process is as shown by dashed lines in FIG. 22(A). As described above, if the light measuring color separation filter device having a sufficiently wide distribution of spectral transmittance is combined with the exposure-purpose color separation filter having sufficiently sharp spectral characteristics, it is possible to easily make the spectral sensitivity distribution of the color paper coincide with that of the light measuring device. With the apparatus according to the present invention, it is possible to provide the coincidence of these spectral sensitivity distributions, with the difference between the print density of the color paper and the measured density of the light measuring system being 0.01 for each of R, G and B. In a subtractive color printer using such a color separation filter as the color separation filter of the light measuring device, the density difference corresponding to the above-described density difference reaches a maximum of 0.14, and therefore the effectiveness of the present invention will be understood. The construction of the remaining portion is identical with that of the first embodiment.

The exposure determining means 44 is adapted to control the motor 16 to cause the rotating disk 14 to rotate and to control a shutter (not shown) disposed ahead of the R filter 17 to provide control over the amount of exposure.

The functions of the blocks shown in FIG. 19 and the operation of the present embodiment are similar to those of the first embodiment, and the description thereof is omitted.

The following is a description of the filters used in the present invention.

It is known that the effective quantity $E_j$ of light acting upon a copying material during the reproduction of a color image from a color original image is represented by the following equation (1):

$$E_j = t_j \int J_{80} \cdot F_{c\lambda} \cdot T_{c\lambda} \cdot T_{M\lambda} \cdot T_{\gamma\lambda} \cdot S_{j\lambda} \cdot d\lambda \tag{8}$$

where $J_\lambda$ ... the distribution of the spectral energy of the light source, $F_{80}$ ... the distribution of the spectral transmittance of each color filter used between the light source and the copying material or the combined distribution of spectral reflectivity composed of the distribution of the spectral transmittance of each color filter and the distribution of the spectral reflectivity of each mirror, $T_{i\lambda}$... the spectral transmittance or the spectral reflectivity of a color original image (where i is one of C, M and Y representing cyan, magenta and yellow, respectively.)

$S_{j\lambda}$... the distribution of the spectral sensitivity of the copying material, $t_j$... exposure time, and j... one of R, G and B representing red, green and blue, respectively.

The above-described effective quantity $E_j$ of light is in general determined with respect to each of the three primary colors of R, G and B, and light of R, G and B is separately controlled to produce a color original image having optimum color and density. The effective quantity of each of R, G and B is controlled on the basis of the distribution of the spectral transmittance (or the distribution of the spectral reflectivity) of each color filter and the duration of exposure time and in accordance with the spectral transmittance (or the spectral reflectivity) of a color original image. Normally, the distribution of the spectral energy of the light source and the distribution of the spectral sensitivity of the copying sensitive material are constant.

A variety of color filters are available for various purposes, and fall into two major types: light control filters which are movably disposed for controlling the quantity of light and spectral wavelength control filters which are stationarily disposed for controlling spectral wavelengths.

C, M and Y cutoff filters, C, M and Y light control filters, color correction filters (CC filters) and the like are available as the light control filters. The C, M and Y cutoff filters are respectively inserted into the optical path to cut off R light, G light and B light, thereby controlling the amount of exposure of (the quantity of light or the exposure time) of R, G and B. The C, M and Y light control filters are respectively inserted into the optical path to control the quantity of light of R, G and B in accordance with the amount of insertion of each of the C, M and Y light control filters. A single color correction filter or a plurality of superimposed color correction filter are used for controlling the quantity of light of R, G and B.

R, G and B color separating filters, wavelength cutoff filters, spectral characteristic correcting filters and the like are available as the above spectral wavelength control filters. The R, G and B color separating filters are used to separate the colors of white color light sources or light having energy distribution over a wide wavelength range, thereby producing proper R, G and B light. The wavelength cutoff filters are filters for cutting off light of particular wavelength, and include, for example, infrared cutoff filters (IR filters) for cutting off heat rays or unwanted light of infrared wavelength; ultraviolet cutoff filters (UV filters) for cutting off unwanted light of ultraviolet wavelength; specific sensitivity cutoff filters for cutting off specific sensitivity (for example, sensitivity with respect to wavelengths of 440 nm or below) which adversely affects photographic color paper, as disclosed in Japanese Patent Laid-open No. 9341/1987; and particular wavelength band cutoff filters, as disclosed in Japanese Patent Laid-open No. 64037/1978, used for cutting off a wavelength band (for example, 480 to 520 nm) harmful to photographic color paper so as to enhance color reproducibility and to enhance the accuracy of the light control filters described above. The particular wavelength band cutoff filters are useful as trimming filters which will be described later. The spectral characteristic correcting filters are used to shift the maximum sensitive wavelength of a copying sensitive material or adjust the color temperature thereof, thereby modifying the distribution of spectral sensitivity of the copying sensitive material or the energy distribution of light. Color glass filters, gelatine filters, plastic filters, multilayer filters and so forth are used as the spectral characteristic correcting filters. Metal-film filters and dielectric multilayer filters are available as the multilayer filters and, in recent years, the dielectric multilayer filters have been often used since they can provide sharp and arbitrary spectral characteristics and excel in durability. The function of the dielectric multilayer filters to cut off light is realized by the reflection of light rather than the absorption of light. In the following description of the present invention, the terms "absorb" "absorption" and "absorption wavelength(s)" are used for convenience to represent the cut-off of light by reflection as well. The term "reflect(ion)" is used for representing reflected light of great interest.

In a color copying apparatus or the like, the filters described above are employed, independently or in combination, for the aforesaid uses for the purpose of accurately measuring the light of a color original document. Other filters such as cold mirrors or dichroic mirrors for reflecting light of selected wavelength only are used for purposes similar to the above-described ones.

The manner in which the filters described above are used in a color photographic printing apparatus will be described below with reference to FIG. 24.

In FIG. 24, reference numeral 100 indicates a sheet of color paper; 140 a negative film; 160 an ultraviolet absorption filter (a UV filter); 180 a mirror box; 200 an incandescent light source; and 200 a shutter.

Part (A) of FIG. 24 shows an additive-color sequential type of color photographic printing apparatus, and a rotating disk 240 having color separation filters of R, G and B and an IR cutoff filter (a cold filter, a heat-resistant filter) 260 are disposed between the mirror box 180 and the light source 200.

In the color photographic printing apparatus shown in Part (B) of FIG. 24, a C, M and Y light control filter device 280 is disposed between the mirror box 180 and the light source 200 for displacement in a direction perpendicular to the optical axis.

In the color photographic printing apparatus shown in Part (C) of FIG. 24, a CC filter device 320 and the IR cutoff filter 260 are disposed between the mirror box 180 and the light source 200, and a C, M and Y cutoff filter device 300 is disposed between the shutter 220 and the lens 120.

In the color photographic printing apparatus shown in Part (D) of FIG. 24, each of R, G and B color separation filters is disposed between each of the shutters 220 and the adjacent light sources 200. Light after color separation is projected onto the negative film 140 by a dichroic mirror 340, and thus the negative film 140 is exposed to the three colors R, G and B at the same time. In each of the apparatus shown in Parts (A) to (D) of FIG. 24, a light sensor 350 for measuring the light transmitted through the negative film 140 is disposed in the vicinity of the lens 120, and a drive section 370 is adapted to drive the color filters and the shutter in accordance with the amount or time of exposure of the three colors which has been determined by a control section 360.

As the system of the color photographic printing apparatus, various other systems are known in addition to the above-described system and, therefore, the above system is not a limitative one. In general, the IR cutoff filter 260 is disposed closest to the light source, and the R, G and B color separation filters, the C, M and Y light control filter device 280 and the CC filter device 320 are disposed between the mirror box and the light source for the purposes of preventing the nonuniformity of colors, forming single-color light devoid of the mixture of color light and colors in the mirror box, and the like. On the other hand, the UV filter 160 and the C, M and Y cutoff filter device 300 which do not greatly affect the occurrence of the nonuniformity of colors are often used between the mirror box and the color paper. Other types of color correction filters such as particular wavelength cutoff filters and spectral characteristic correcting filters are disposed between the mirror box and the light source, similarly to the CC filter device. The reasons for this are: (1) that, if such color correction filters are disposed between the mirror box and the color paper, light is diffused due to the nonuniform coating of the multilayer film filter or by the mirror box; (2) that the spectral characteristics vary due to the diffused light; (3) that, since replacement of mirror boxes is performed in accordance with the size of film to be used, filters corresponding to the sizes of the respective mirror boxes must be prepared; and (4) that color filters of large size are needed.

Figure 25A:
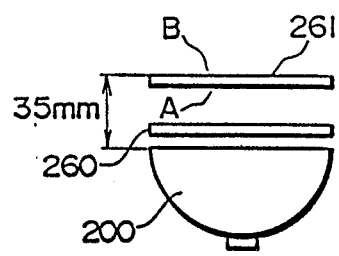
FIG. 25(A) is a schematic view showing the position of the color filter of each of FIGS. 24(A) to 24(D) when it is arranged.
Figure 25B:
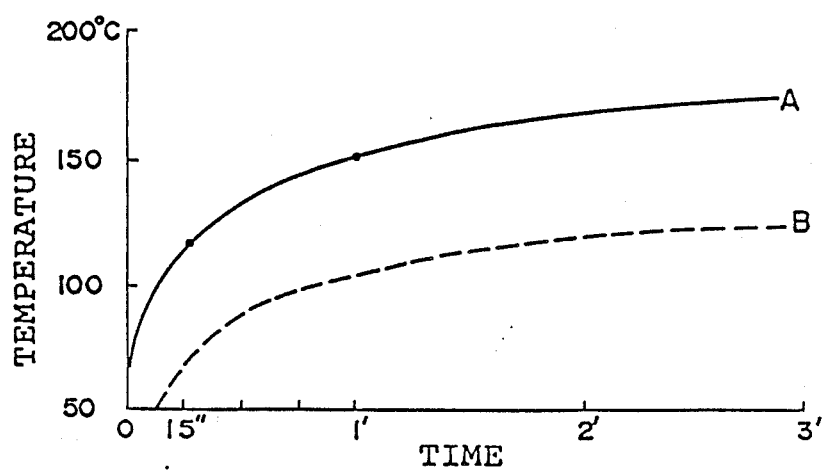
FIG. 25(B) is a chart showing temperature variations with time of a conventional color filter.
Figure 26:
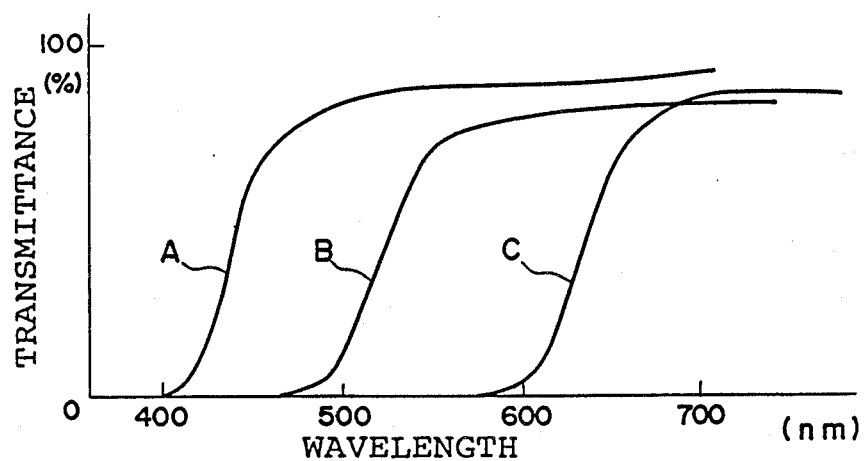
FIG. 26 is a chart showing the transmittance characteristics of a short-wave absorbing filter.

However, the temperature between the light source and the mirror box commonly reaches 100° to 200° C. even if air is sent or discharged by a fan or the like. As shown in FIG. 25(A), the present inventors experimentally disposed the IR cutoff filter 260 in the vicinity of the light source 200 and the color filter 261 at a location 35 mm away from the light source 200, and employed the rated 24-V, 250-W light source 200 at 15V to measure the temperature of a surface A of the color filter 261 adjacent to the color filter 260 and that of a surface B of the color filter 261 opposite to the filter 260. The results are shown in FIG. 25(B). As will be understood from FIG. 25(B), when about one minute elapses after the light source has turned on, the surface A of the color filter 261 located on the side of the light source rises to about 150° C., while the opposite surface B rises to about 100° C. Therefore, if the filter is used continuously or intermittently in such a high-temperature ambience, the following problems occur. (The intermittent use of the filter is performed: when the rotating disk having the R, G and B color separation filter device is rotated; when the light control filter device is automatically adjusted; and when the illumination of the light source is to be controlled so as to increase the intensity of illumination during printing and to reduce that intensity during stoppage.)

First, since long-wavelength (heat rays) absorbing color glass filters absorb heat rays, they may be broken or damaged due to distortion, thermal shock or the like caused by a difference in temperature distribution. On the other hand, since short-wave cutoff (short-wavelength absorbing) color glass filters absorb no heat rays, they are not broken due to heat but, as is known, their transmittance wavelength band is shifted to a long-wave side due to heat, with the result that their spectral distribution characteristics and transmittance (or reflectivity) vary. In general, it is known that, in the case of a short-wave absorbing color glass filter having the characteristic represented by A in FIG. (B) its transmittance wavelength band is shifted to a long-wave side at about 0.08 nm/° C.; that, in the case of a short-wave absorbing color glass filter having the characteristic B, its transmittance wavelength band is shifted to a long-wave side at about 0.10 nm/° C.; and that, in the case of a short-wave absorbing color glass filter having the characteristic C, its transmittance wavelength band is shifted to a long-wave side at about 0.15 nm/° C. It is generally known that the transmittance wavelength band is shifted to a long-wave side by 15 nm at 150° C.

In multi-coated filters coated with a dielectric multilayer film, it is observed that their spectral characteristics are shifted to a short-wave side due to heat, and the about 10 to 15 nm shift of the spectral characteristics toward the short-wave side takes place, particularly in the vicinity of an incandescent light source.

The following is a description of a color separation filter composed of a combination of the above-described color glass filters and dielectric multilayer film.

Figure 27:
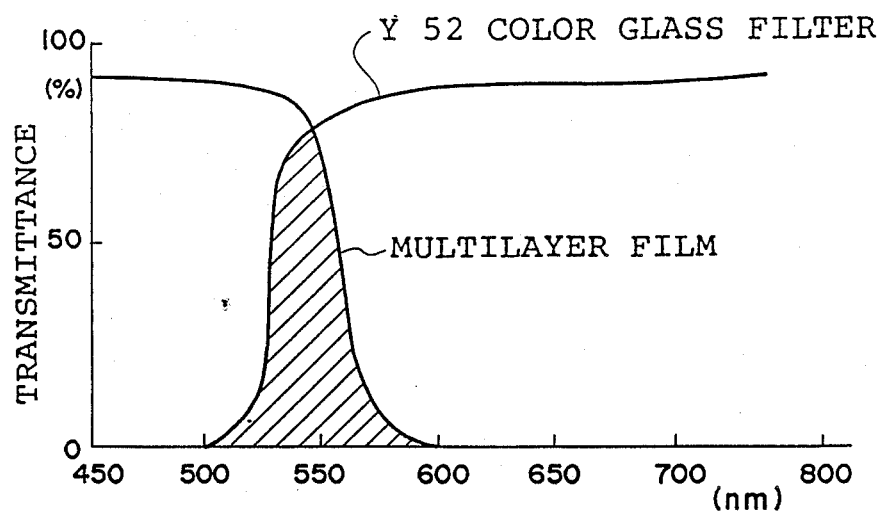
FIG. 27 is a chart showing the characteristic of a filter constituted by a color glass filter coated with a dielectric multilayer film.
Figure 28:
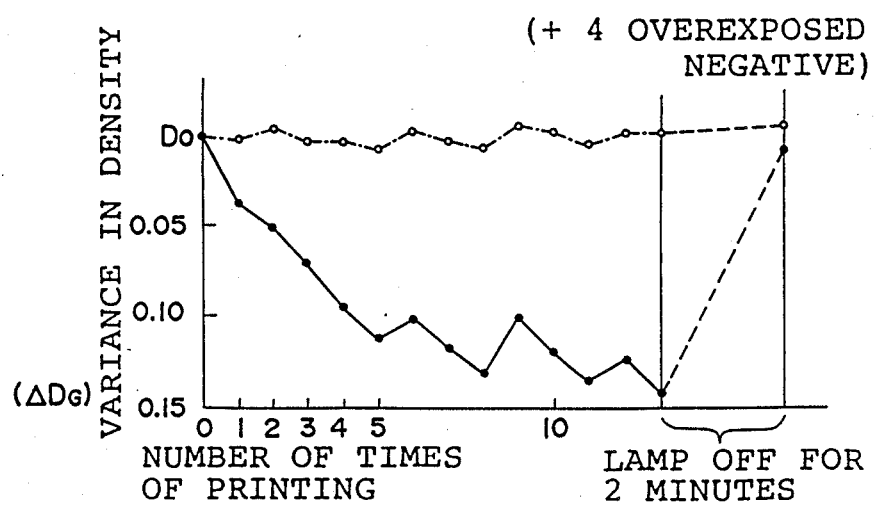
FIG. 28 is a chart showing variance in the density of prints when continuous exposure is performed using the filter of FIG. 27.

A short-wave absorbing filter (a Y-52 color glass filter) having the characteristic shown in FIG. 27 was coated with a dielectric multilayer film so as to form the short-wave transmittance wavelength band shown in FIG. 27, and thus a G color separating filter was prepared. The same frame of a negative film which had been overexposed by +4 was continuously printed by an additive color process by using the G color separating filter. FIG. 28 shows a variance ($\Delta D_G$) in the density of the prints. As can be seen from the graph of FIG. 28, as the number of times of printing increases, that is, as the temperature of the filter rises, the variance in the density increases. In addition, it will be understood that, if the lamp has been cooled for two minutes after switched off, the initial density is obtained when printing is restarted. The distribution of the relative energy with respect to variations with time of light transmitted through the color separation filter having the characteristic shown in FIG. 27 changes as shown in FIG. 29. FIG. 29 shows the result of measurement, using the positional relationship shown in FIG. 25(A), of the distribution of relative energy of light transmitted through the filter from the time that the light source has been turned on until a two-minute period has elapsed. It is understood from FIG. 29 that the long-wavelength edge of the transmittance band of the color separation filter (which edge is formed by the dielectric multilayer film) is shifted to a short-wave side with the passage of time and hence with a temperature rise, while the short-wavelength edge (formed by the color glass filter) is shifted to a long-wave side with a temperature rise.

The following is a description of the trimming filter.

When an image is to be printed from a color film onto a color copying material, it is desirable that the following equation (9) be satisfied when i≠j in the previously-described equation (8):

$$T_{i\lambda} \cdot S_{j\lambda} = 0 \qquad (9)$$

In other words, it is required that the quantity of light absorbed by each color sensitive layer of a color film be transmitted to a color copying material with an exact correspondence and without being influenced by the other color sensitive layers and in an exact relationship; for example, it is necessary that a yellow dye formed by the blue sensitive layer of the color film do not influence the green sensitive layer of the color copying material. In order to satisfy the above equation (9), it is desirable that the respective color sensitive layers of the color copying material have a sharp sensitivity characteristic with their sensitivities other than the primary sensitivity as low as possible. As described above, such a particular wavelength-band cutoff filter is effective as the trimming filter.

Figure 30A:
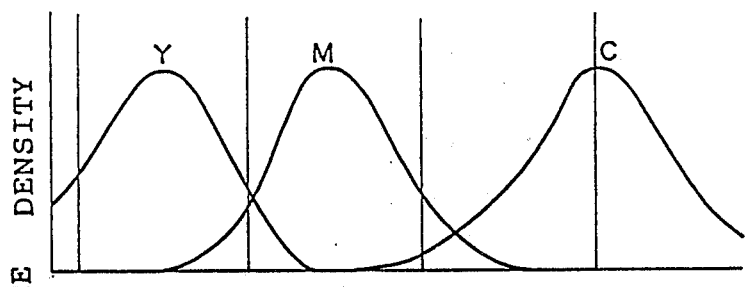
FIG. 30(A) is a graphic representation of the spectral absorption of color dyes of a color original image.
Figure 30B:
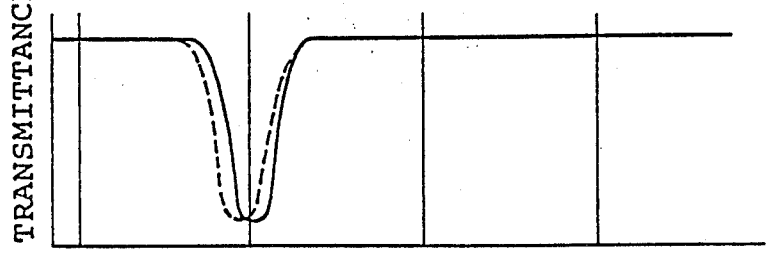
FIG. 30(B) is a graphic representation of the spectral transmittance characteristics of a trimming filter.
Figure 30C:
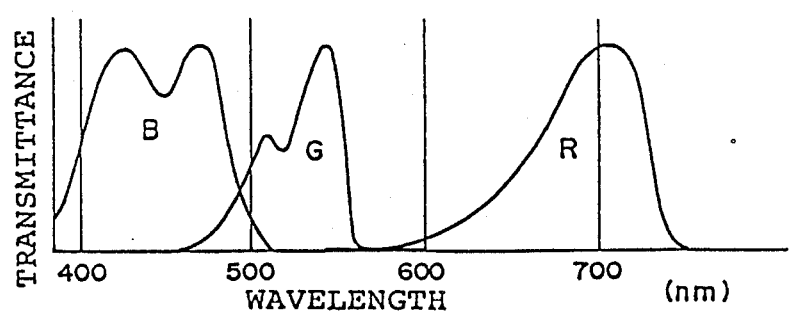
FIG. 30(C) is a graphic representation of the spectral sensitivity of a sensitive material for color copying.

Part (A) of FIG. 30 shows the characteristics of the spectral absorption (density) of each of the dyes of a color original image (a color film), and part (C) of FIG. 30 shows the characteristics of the spectral sensitivity of the color copying sensitive material. When the G sensitivity of the copying sensitive material is viewed, the G sensitivity exhibits, in the vicinity of 500 nm, about half its peak level and is influenced by the yellow dye. For this reason, it is preferable to employ a trimming filter for cutting off the overlapped wavelength band of the B and G sensitivities, that is, a trimming filter having the distribution characteristics of the special transmittance shown in FIG. 30(B), more particularly, a filter which has a sharp sensitivity characteristic with lowering in the maximum level of each of the B and G sensitivities being reduced to an extent as small as possible. Use of such a trimming filter provides the effect of improving the quality of color separation in the reproduction of colors.

However, if the above-described trimming filter is used under high-temperature conditions, its wavelength band shifts to a short-wave side by 5 to 8 nm as shown in part (B) of FIG. 30, and this shift influences the maximum level of the B sensitivity, with the result that problems such as a reduction in the level of sensitivity, a nonuniform sensitivity and a nonuniform trimming effect may take place.

As described above, when used in the vicinity of an incandescent light source, a color filter may be broken or damaged by the influence of heat or the spectral distribution characteristics thereof may change. To solve the problem, filters may be designed for taking account of the influence of heat. However, in some cases, for the purpose of maintaining the lifetime of a light source lamp, the intensity of illumination of the lamp is decreased while it is not used, and increased when in use, with the result that temperature changes occur at random. Accordingly, even if the filter is designed by taking account of temperature changes, wavelength changes will take place. Similarly, such wavelength changes occur because of variations in ventilation due to the clogging of an air filter used for exhaust or ventilation around the lamp. The wavelength changes may be caused by variations in the transmittance of the optical system due to, for example, dust, discoloration and the characteristic change of the mirror box, temperature changes due to the change of a light-source voltage for compensation for a deficiency of the quantity of light or the like, and a temperature difference due to the difference between the optical systems in a printing apparatus. Japanese Patent Laid-open No. 62008/1982 discloses an apparatus for preventing the transmittance change of a glass material due to temperature changes by using a temperature control means, and Japanese Patent Laid-open No. 113627/1976 discloses an apparatus for eliminating variations in the spectral wavelength edge of a filter due to the influence of temperature by means of another filter. In addition, although various optical systems for preventing temperature rises are available, none of such optical systems provide satisfactory effects; rather, the use of them leads to increases in the size and cost of the apparatus and hence makes it difficult to provide a satistactory apparatus.

In solving the above problems, it is necessary to provide a color filter which utilizes a dielectric multilayer film having sharp spectral characteristics and allowing selection of arbitrary wavelengths and whose spectral distribution characteristics do not change due to temperature changes.

Such a color filter which is disposed near the incandescent light source of an apparatus for producing a color image from a color original image by using the incandescent light source may be constituted by a first member coated with a dielectric multilayer film which forms a transmittance wavelength band and a second member bonded to the coated surface of the first member.

The first member is coated with the dielectric multilayer film which forms the transmittance wavelength band. The second member is bonded by an adhesive to the coated surface of the first member that is coated with the dielectric multilayer film, whereby the dielectric multilayer film is not exposed to air.

The material of the first member may be selected from among a white plate glass, a color glass filter and a multi-coated filter in which a dielectric multilayer film which does not interfere its transmittance wavelength band is coated on a surface which is not bonded to the second member, that is, a surface which is not coated with the dielectric multilayer film which forms the transmittance wavelength band. The material of the second member may be selected from among a white plate glass, a color glass filter and a multi-coated filter coated with a dielectric multilayer film which does not interfere its transmittance wavelength band.

Several examples in which such a white plate glass is used will be described later with reference to FIG. 23.

In the example shown in part (A) of FIG. 23, a white plate glass 400 is coated with a transmittance multilayer film 420 which forms a transmittance wavelength band, and a white plate glass 440 is bonded to the coated surface of the white glass 400.

In the example shown in part (B) of FIG. 23, the white plate glass 400 is coated with the transmittance multilayer film 420 which forms the transmittance wavelength band, and the white plate glass 440 which is coated with a dielectric multilayer film 460 is bonded to the coated surface of the white plate glass 400. The dielectric multilayer film 460 may be constituted by either a dielectric multilayer film which forms a transmittance wavelength band or a dielectric multilayer film which does not interfere the transmittance wavelength band.

In the example shown in part (C) of FIG. 23, the white plate glass 400 is coated with the dielectric multilayer film 420 which forms a transmittance wavelength band, and the coated surface of the white plate glass 400 is bonded to a non-coating surface of the white plate glass 440 having the other surface coated with a dielectric multilayer film 480 which does not interfere the transmittance wavelength band.

In the example shown in part (D) of FIG. 23, the white plate glass 400 is coated on one side thereof with the dielectric multilayer film 420 which forms a transmittance wavelength band and on the other side with the dielectric multilayer film 480 which does not interfere the transmittance wavelength band, and the white plate glass 440 is bonded to the surface of the white plate glass 400 that is coated with the dielectric multilayer film 420. Either or both of the white plate glasses 400 and 440 may be constituted by a color glass filter. The first member and the second member may be bonded together by applying a heat-resistant adhesive to the overall surfaces thereof or to the peripheries thereof, or may be sealed by a resin or a heat-resistant rubber.

Also, any of the filters described above may be coated with a reflection film to form a filter such as a dichroic mirror or the like employing reflected light.

Accordingly, the dielectric multilayer film can be utilized to provide a color filter having high-precision and stable spectral characteristics which can be disposed in the vicinity of an incandescent light source.

The following is a description of several forms of the above-described color filters. When in use, the present color filters can assume the following form of arrangement.

In accordance with the form of arrangement, the first member or the second member is constituted by a long-wave transmitting color glass filter having an absorption band in the region between the short-wave edge of the transmission wavelength band which is formed by a dielectric multilayer film and a predetermined wavelength shorter than the short-wave edge.

As illustrated in the above form of arrangement, the transmission wavelength edge of the color glass filter is provided in a wavelength region which is shorter (by at least about 8 nm) in wavelength than the wavelength edge of the transmission wavelength band formed by the dielectric multilayer film so that the color glass filter may not interfere the transmission wavelength band even when its characteristic vary by heat during use. The color glass filter has an extremely high absorption characteristic, and can be combined with a multi-coated filter having a sharp spectral characteristic and allowing selection of an arbitrary wavelength to make narrow the wavelength band which is to be absorbed by the multi-coated filter. Accordingly, it is possible to facilitate the production of filters and to produce high reliable filters at low cost.

Several examples of the above-described color filter will be described in detail below.

Figure 31:
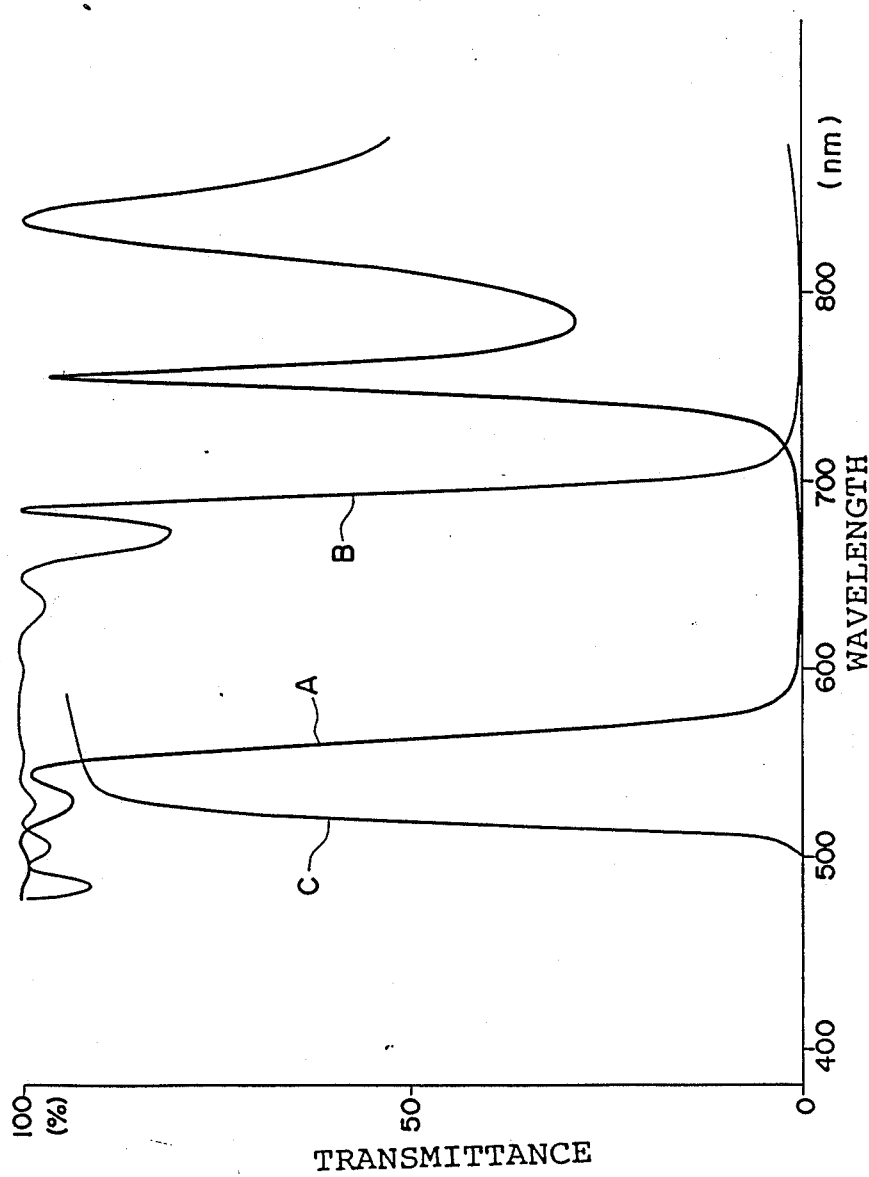
FIG. 31 is a chart showing the characteristic of a first example of the present inventive filter.

Initially, a first example will be explained below. A dielectric multilayer film composed of twenty-third alternate layers of $TiO_2$ and $SiO_2$ was coated over a 1.0-mm thick white plate glass by vacuum deposition to prepare a multi-coated filter having characteristics represented by curves A and B in FIG. 31. A color glass filter (Y-52 color glass filter) having the characteristic (curve C) shown in FIG. 31 was bonded to the coated surface of the multi-coated filter by a heat-resistant epoxy-system adhesive, and a color filter having the characteristic shown in FIG. 34 was prepared. This color filter had a structure in which a color glass filter was substituted for one of the white plate glasses of FIG. 23(A).

Figure 32:
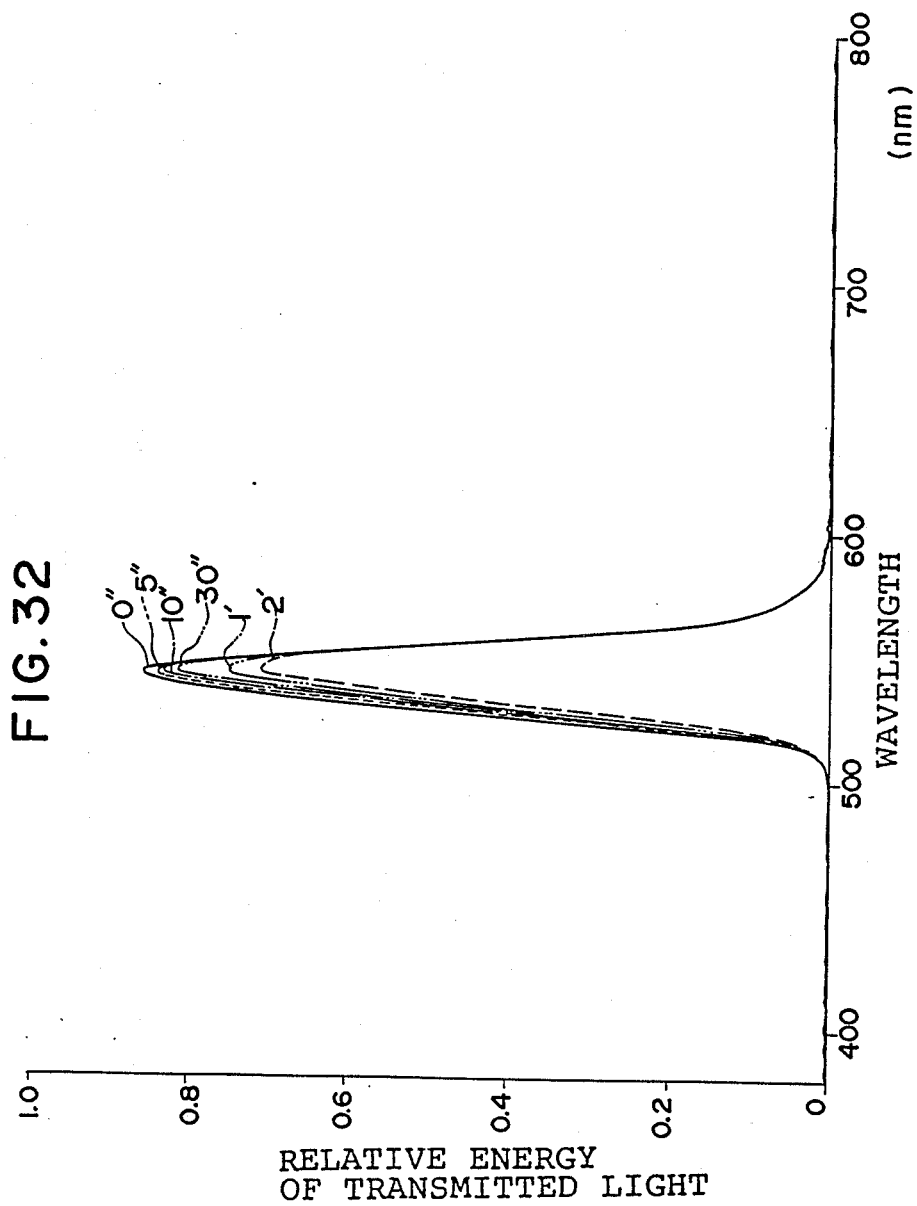
FIG. 32 is a chart showing variations in the relative energy distribution of transmitted light with respect to variations in the temperature of the filter shown in FIG. 31.

The color filter was placed at the location of the color filter 360 shown in FIG. 25(A), and variations in the relative energy distribution of light transmitted through the color filter were measured for two minutes. FIG. 32 shows the result of the measurement. As will be understood from FIG. 32, the spectral characteristic of the portion deposited with the dielectric material which forms the transmission wavelength band do not depend upon temperatures, and only the spectral characteristic of the color glass filter varies with temperature changes.

Figure 33:
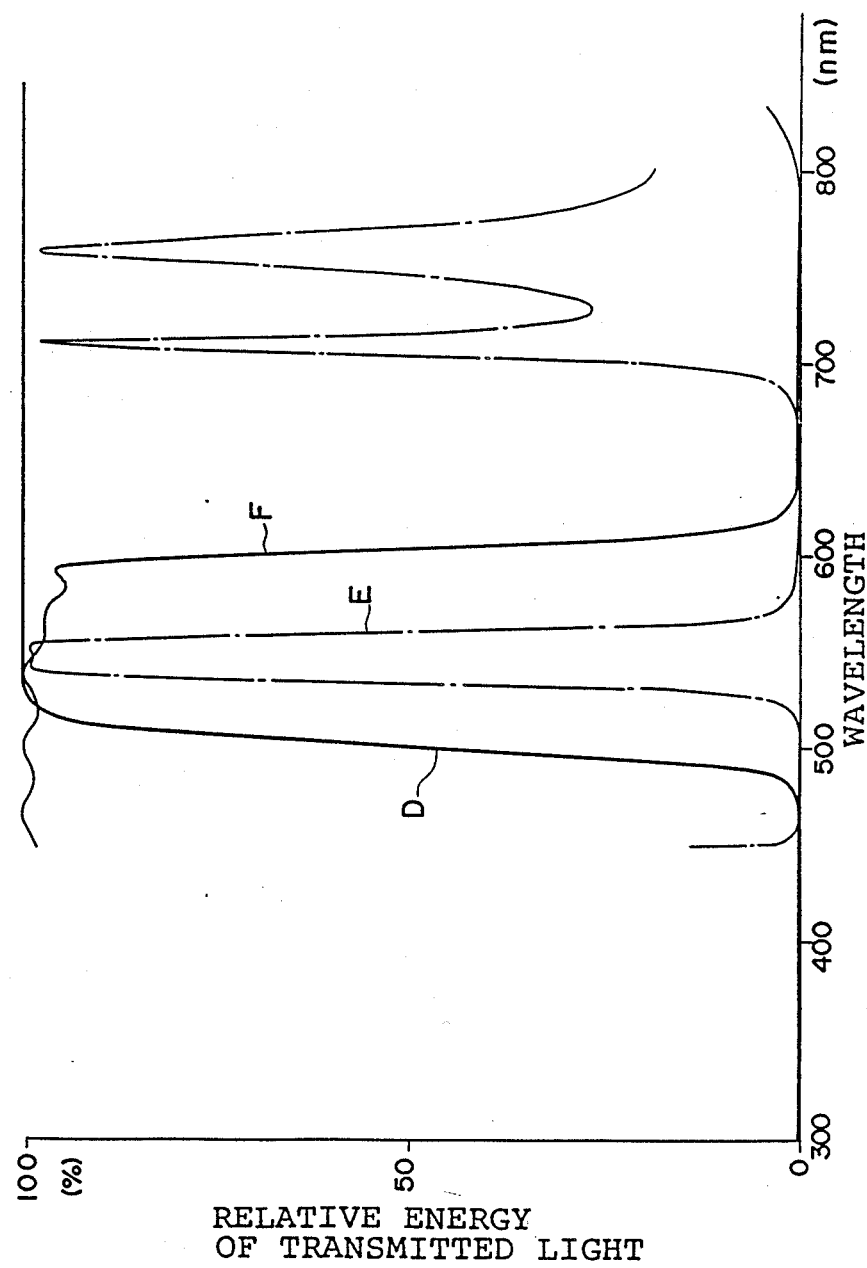
FIG. 33 is a chart showing the characteristic of a second example of the present inventive filter.

A second example will be explained below. A dielectric multilayer film having the characteristic represented by curve E in FIG. 33 and composed of twenty-seven alternate layers of $TiO_2$ and $SiO_2$ was coated by vacuum deposition over a color glass filter (Y-50 color glass filter) having the characteristic shown by the curve D of FIG. 33. A short-pass (short-wave transmission) filter of characteristic shown by curve F was bonded to the coated surface of the color glass filter by a heat-resistant epoxy-system adhesive, and the color filter of the present example was prepared. This color filter had a structure in which a color glass filter was substituted for the white plate glasses of FIG. 23(A).

Figure 34:
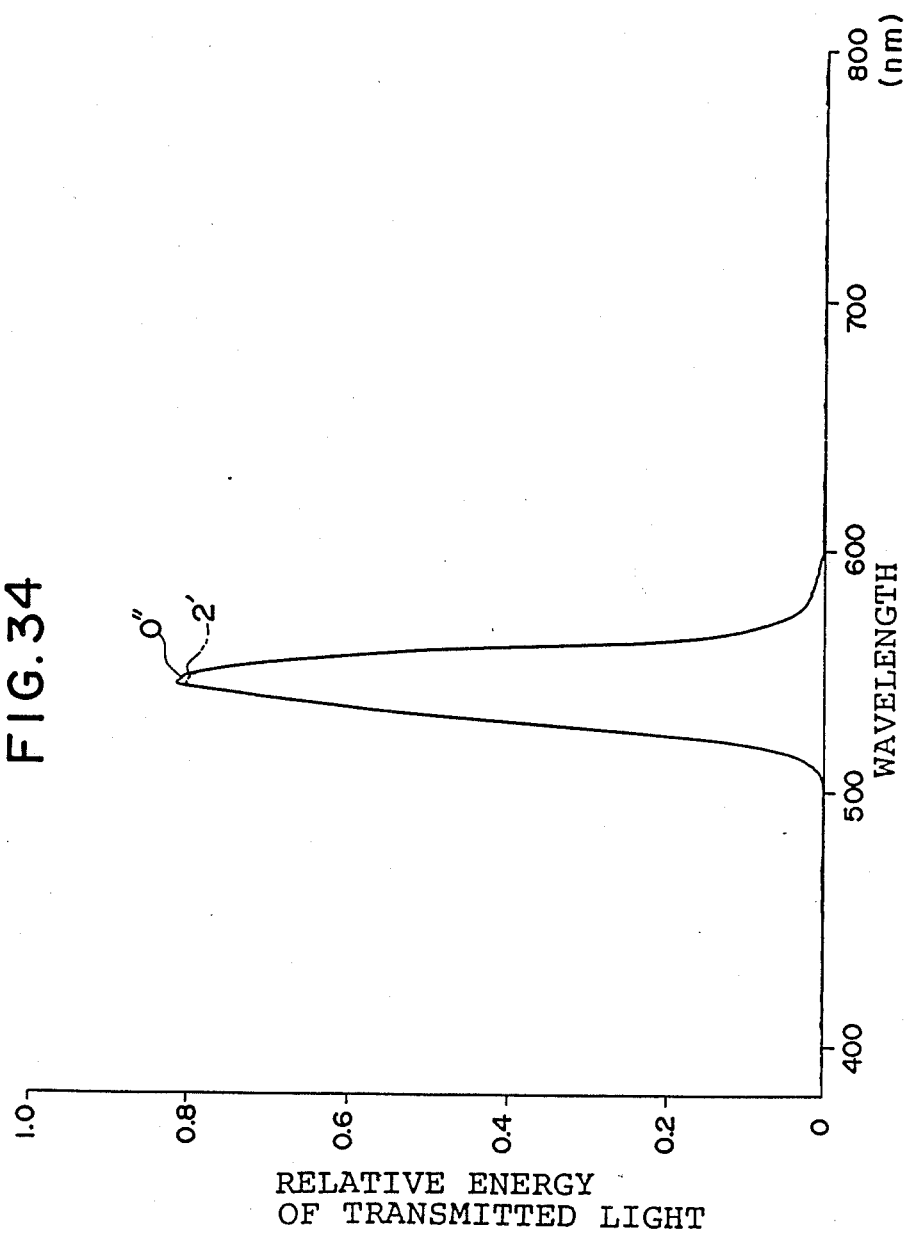
FIG. 34 is a chart showing the temperature characteristic of the filter of FIG. 33.

The color filter was placed at the location of the color filter 360 shown in FIG. 25(A), and variations in the relative energy distribution of light transmitted through the color filter were measured for two minutes. FIG. 34 shows the result of the measurement. Prints were continuously produced from the same frame of a negative film which had been overexposed by +4, and a good result was obtained as shown by a one-dot chain line in FIG. 28.

Figure 35:
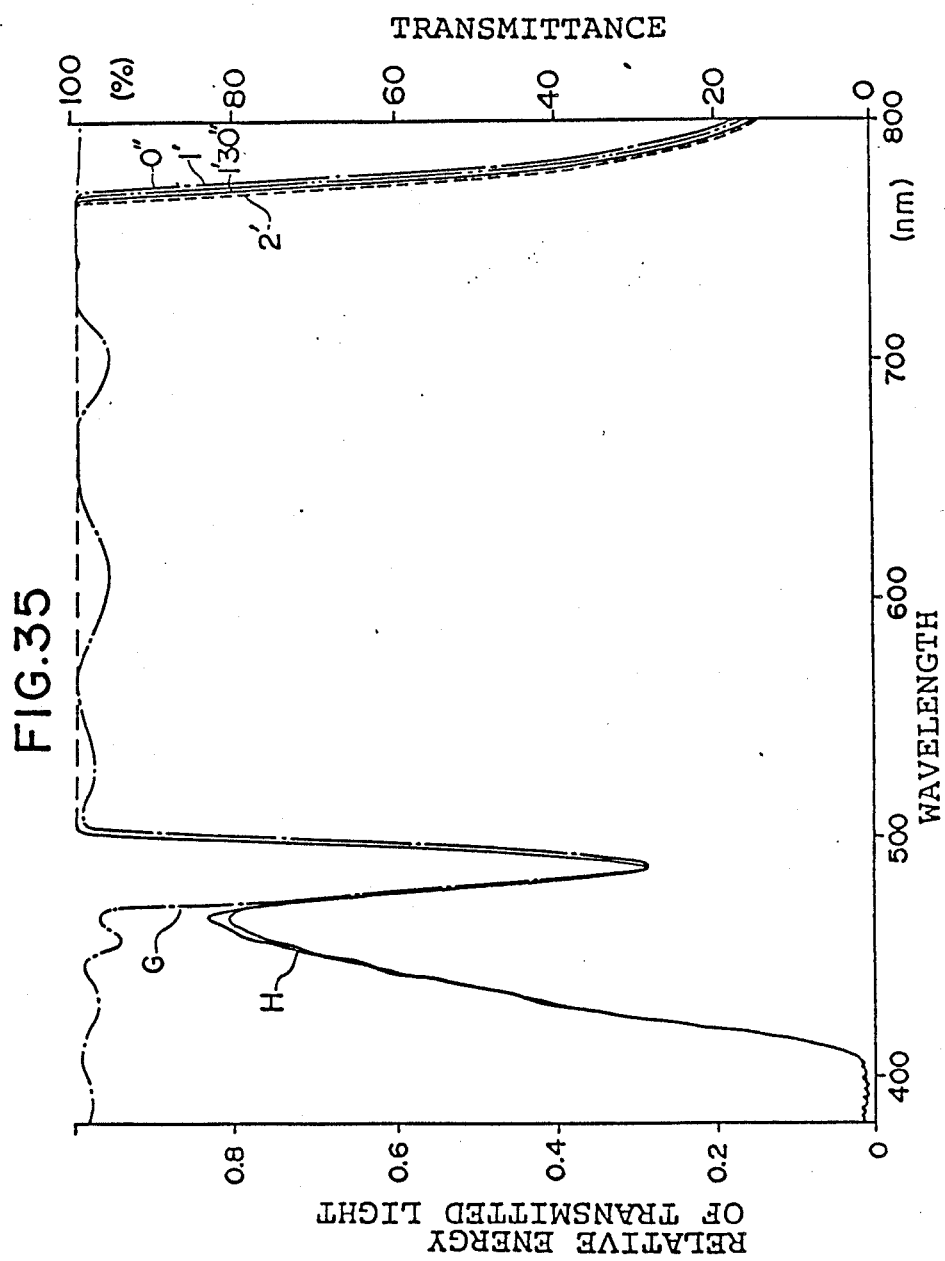
FIG. 35 is a chart showing variations in the relative energy distribution (H) of transmitted light with respect to variations in the temperature of a spectral transmittance curve (G) of a trimming filter.

A trimminng filter as a third example will be explained below. A dielectric multilayer film composed of thirty alternate layers of $TiO_2$ and $SiO_2$ was coated over a 1.0-mm thick white plate glass by vacuum deposition so as to have a transmittance characteristic such as that shown by curve G in FIG. 35. The coated surface was bonded to a white glass filter by a heat-resistant epoxy-system adhesive. This color filter has a structure similar to that shown in FIG. 23(A).

The color filter was placed at the location of the color filter 360 shown in FIG. 25(A) and variations in the relative energy distribution of light transmitted through the color filter were measured for two minutes. Curve H of FIG. 32 shows the result of the measurement. The curve of the IR cutoff filter 260 is shifted from curve H of FIG. 35 to a shorter-wave side in the range of 750 to 800 nm. However, there is no change in the band stop wavelength of 490 nm. Incidentally, since the relative energy level is excessively large in the range of 500 to 750 nm, the plotting thereof is omitted as shown by a broken line.

Each of the filters explained in the above-described examples is disposed at the location of a corresponding filter of a color image forming apparatus such as the color photographic printing apparatus shown in FIG. 24, and thus another modified form can be provided. For example, the above-described filter having a sealed dielectric multilayer film may be used as the R, G and B color separating filters provided in the rotating disk 24.

In the above-described examples, a filter having a high-precision stable spectral characteristic and a high degree of physical strength can be readily disposed in the vicinity of an incandescent light source without the need to use special apparatus. It is, accordingly, possible to eliminate the nonuniformity of colors, to prevent the influence by a diffusion member in the mirror box, to prevent variations in filter characteristics due to temperature variations caused by variations in the light source and by the influence of the changing of the size of the mirror box, and to reduce the size of the filter.

Although the above description refers to filters of the transmission type which transmits light, the present inventive filters are not limited to such a type, and may be constituted as a reflection type which reflects light.

In addition, any of the present color filters can be used as color separation filters for separating the three primary colors of R, G and B, light control filters for C, M and Y, a wavelength-selective reflection mirror, color separation filters for an R, G and B color sensor for monitoring a light source, and the like. Furthermore, the present inventive filters can be used in the vicinity of a light source of such an apparatus as a color copying machine having a diffusion member or at locations that cannot avoid temperature rises due to the light source. In a case where a diffusion member is disposed immediately after a light source of a photographic enlarger on the optical axis thereof, the present filter may be arranged between the light source and the diffusion member. It is to be noted that, in essence, dielectric multilayer filters slightly vary by the influence of ambient temperature or humidity even below the above-described high temperature. Therefore, if highly precise spectral characteristics or high stability is required, the present filters are not limited to the above-described layout or arrangement and various modified forms can be effectively employed.

What is claimed is:

1. A color photographic printing method of printing a color film on the basis of a measurement value measured by a light measuring device which has a spectral sensitivity distribution coinciding with or similar to a substantially effective spectral sensitivity distribution of red-sensitive, green-sensitive and blue-sensitive layers of a color paper, and which measures red light, green light and blue light passing through the color film, emitted from a light source, and on the basis of the printing condition of a reference film type, comprising the steps of:
   (a) calculating the common film characteristic of the type of a film to be printed;
   (b) comparing the common film characteristic of said reference film type with the film characteristic of the type of said film to be printed; and
   (c) correcting the printing condition of said reference film type on the basis of the result of the comparison in said Step (b) and calculating an amount of exposure for printing from said measurement value to thereby effect printing of said film.

2. A color photograph printing method according to claim 1, wherein said film characteristic is at least one of the spectral characteristic of a coloring material of a film, a Y value, a film base density, and a density or value defining the shape of the characteristic curve of said film.

3. A color photograph printing method according to claim 1, wherein, in a case where said printing condition is corrected using a γ value, the amount of exposure correction is used which is obtained from one of the ratio of the γ value of the type of said film to be printed to the γ value of said reference film type, a slope control ratio calculated from a density ratio of said reference film type to the type of said film to be printed, the difference between the γ value of said reference film type and the γ value of the type of said film to be printed, and the difference in density between said reference film type and the type of said film to be printed.

4. A color photographic printing apparatus comprising:
   a light source section for separating white light into red light, green light and blue light by means of color separation filters of red, green and blue and for projecting said red light, said green light and said blue light onto a color film, said color separation filters being formed by a light transmitting member disposed in close contact with a surface of a dielectric multilayer film, and being each provided with a color glass having a transmittance wavelength band contained in the photographic wavelength region of each of red-sensitive, green-sensitive and blue-sensitive layers of a color paper, and provided with a dielectric multilayer film and light transmitting member which is disposed in close contact with said dielectric multilayer film;
   a light measuring device for measuring the three colors carried by said red, green and blue lights emitted from said light source section and transmitted through said color film; and
   control means for controlling the amount of exposure on the basis of a predetermined printing condition of a reference film type and the measurement value provided by said light measuring device.

5. A color photographic printing apparatus according to claim 4, wherein said light measuring device is provided with a spectral sensitivity distribution approximately equal to or greater than the half-width of the spectral transmittance distribution of said color separation filters.

6. A color photographic printing apparatus according to claim 4, further comprising measurement-value selecting means for selecting particular measurement value in accordance with a predetermined reference from among the measurement values of said three colors provided by said light measuring device.

7. A color photographic printing apparatus according to claim 5, wherein said light source section includes an incandescent light source for emitting said white light, said color separation filters being disposed in the vicinity of said incandescent light source.

8. A color photographic printing apparatus according to claim 7, wherein each of said color separation filters is constituted by said color glass coated with said dielectric multilayer film.

9. A color photographic printing apparatus according to claim 8, wherein said color light transmitting member includes one of a color glass filter and a multi-coated filter coated with a dielectric multilayer film which does not interfere said transmission wavelength band.

10. A color photographic printing apparatus according to claim 8, wherein said light measuring device is constituted by a single two-dimensional image sensor.

11. A color photographic printing apparatus in which red light, green light and blue light of light transmitted through a color film are measured by a light measuring device and color filters of yellow, magenta and cyan are inserted into an optical path in accordance with the measurement values provided by said light measuring device so that the amount of exposure of each of red-sensitive, green-sensitive and blue-sensitive layers of color paper is controlled to produce a print from said color film, comprising:
   a first limiting filter capable of limiting the long wave of blue light and the short wave of green light;
   a second limiting filter capable of limiting the long wave of green light and the short wave of red light;
   an ultraviolet cutoff filter; and
   an infrared cutoff filter,
wherein said first and second limiting filters, said ultraviolet cutoff filter and said infrared cutoff filter are disposed between said color film and said light source so that said ultraviolet cutoff filter and said first limiting filter cooperate with each other to form blue light for exposure, said first limiting filter and said second limiting filter cooperating with each other to form green light for exposure, and said infrared cutoff filter and said second limiting filter cooperating with each other to form red light for exposure, and
wherein said light measuring device comprises a color separation filter device including:
- a blue filter having a transmittance long-wave edge contained in one of the wavelength region between the short-wave edge of the absorption band of said first limiting filter and a predetermined wavelength shorter than said short-wave edge and said absorption band of said first limiting filter;
- a green filter having a transmittance short-wave edge contained in one of the wavelength region between the long-wave edge of the absorption band of said first limiting filter and a predetermined wavelength longer than said long-wave edge and said absorption band of said first limiting filter and a transmittance long-wave edge contained in one of the wavelength region between the short-wave edge of the absorption band of said second limiting filter and a predetermined wavelength shorter than said short-wave edge and said absorption band of said second limiting filter; and
- a red filter having a transmittance short-wave edge contained in one of the wavelength region between the long-wave edge of the absorption band of said second limiting filter and a predetermined wavelength longer than said long-wave edge and said absorption band of said second limiting filter.

12. A color filter disposed in the vicinity of an incandescent light source in a color photographic printing apparatus for printing an image from a color film onto color paper by means of said incandescent light source, comprising a first member coated with a dielectric multilayer film which forms a transmission wavelength band and a second member adhesively disposed on the surface of said first member that is coated with said dielectric multilayer film.

13. A color filter according to claim 12, wherein said first member is constituted by a material selected from the group consisting of a white plate glass, a color glass filter and a multi-coated filter coated with a dielectric multilayer film which does not interfere with said transmission wavelength band.

14. A color filter according to claim 12, wherein said second member is constituted by a material selected from the group consisting of a white plate glass, a color glass filter and a multi-coated filter coated with a dielectric multilayer film which does not interfere with said transmission wavelength band.

15. A color filter according to claim 12, wherein said second member is constituted by a material selected from the group consisting of a white plate glass, a color glass filter and a multi-coated filter having a surface which is not contacted with said first member which surface is coated with a dielectric multilayer film which does not interfere with said transmission wavelength band, said white plate glass, said color glass filter and said multi-coated filter each having a surface adhesively disposed on said first member and coated with a dielectric multilayer film which forms said transmission wavelength band 16. A color filter according to claim 12, wherein said first member is constituted by a long-wave transmitting color glass filter having an absorption band in the region between the short-wave edge of the transmission wavelength band formed by said dielectric multilayer film and a predetermined wavelength shorter than said short-wave edge.

* * * * *